(12) United States Patent
Mohassel et al.

(10) Patent No.: US 12,028,454 B2
(45) Date of Patent: Jul. 2, 2024

(54) MULTI-PARTY THRESHOLD AUTHENTICATED ENCRYPTION

(71) Applicant: Visa International Service Association, San Francisco, CA (US)

(72) Inventors: Payman Mohassel, San Jose, CA (US); Pratyay Mukherjee, Sunnyvale, CA (US); Shashank Agrawal, Sunnyvale, CA (US); Eric Le Saint, Los Altos, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/063,606

(22) Filed: Dec. 8, 2022

(65) Prior Publication Data

US 2023/0106151 A1    Apr. 6, 2023

Related U.S. Application Data

(63) Continuation of application No. 16/652,782, filed as application No. PCT/US2017/059073 on Oct. 30, 2017, now Pat. No. 11,552,797.

(51) Int. Cl.
| | |
|---|---|
| *H04L 9/32* | (2006.01) |
| *H04L 9/06* | (2006.01) |
| *H04L 9/08* | (2006.01) |

(52) U.S. Cl.
CPC ............ *H04L 9/321* (2013.01); *H04L 9/0618* (2013.01); *H04L 9/0643* (2013.01); *H04L 9/085* (2013.01);
(Continued)

(58) Field of Classification Search
None
See application file for complete search history.

(56) References Cited

U.S. PATENT DOCUMENTS

| | | | |
|---|---|---|---|
| 8,320,559 B1 * | 11/2012 | Boneh | H04L 9/0841 713/168 |
| 8,984,268 B2 * | 3/2015 | VanHeyningen | H04L 63/166 380/37 |

(Continued)

FOREIGN PATENT DOCUMENTS

| | | |
|---|---|---|
| WO | 2016135738 | 9/2016 |
| WO | 2017106793 | 6/2017 |
| WO | 2017179059 | 10/2017 |

OTHER PUBLICATIONS

Application No. EP23162852.0, Extended European Search Report, dated Apr. 12, 2023, 6 pages.
(Continued)

*Primary Examiner* — Jeffrey C Pwu
*Assistant Examiner* — Mayasa A. Shaawat
(74) *Attorney, Agent, or Firm* — Kilpatrick Townsend & Stockton LLP

(57) ABSTRACT

Systems and methods for threshold authenticated encryption are provided. A collection of cryptographic devices may encrypt or decrypt a message, provided that a threshold number of those devices participate in the encryption process. One cryptographic device may generate a commitment message and transmit it to the other selected devices. Those devices may each perform a partial computation using the commitment message, and transmit the partial computations back to the encrypting or decrypting device. The encrypting or decrypting device may use those partial computations to produce a cryptographic key, which may then be used to encrypt or decrypt the message.

20 Claims, 12 Drawing Sheets

(52) U.S. Cl.
CPC .......... *H04L 9/0869* (2013.01); *H04L 9/3218* (2013.01); *H04L 2209/46* (2013.01)

(56) References Cited

U.S. PATENT DOCUMENTS

| | | |
|---|---|---|
| 9,246,674 B2 | 1/2016 | Brainis et al. |
| 11,552,797 B2 | 1/2023 | Mohassel et al. |
| 2002/0016913 A1* | 2/2002 | Wheeler ............... H04L 9/3247 713/181 |

OTHER PUBLICATIONS

R. Gennaro, "Securing Threshold Cryptosystems against Chosen Ciphertext Attack", IBM Research Report RZ 2974, 1997. J. Cryptology 15(2):75-96, 2002. Extended abstract in Proc. Eurocrypt '98, 22 pages.

Naor, M., Pinkas, B., Reingold, O. (1999), "Distributed Pseudo-random Functions and KDCs", In: Stern, J. (eds) Advances in Cryptology—EUROCRYPT '99. EUROCRYPT 1999. Lecture Notes in Computer Science, vol. 1592. Springer, Berlin, Heidelberg, 20 pages.

PCT/US2017/059073, "International Search Report and Written Opinion", dated Jul. 13, 2018, 22 pages.

Application No. EP17930262.5, Extended European Search Report, dated Aug. 14, 2020, 5 pages.

Han et al., "Threshold Signcryption Based on Elliptic Curve", Information Technology and Computer Science, Jul. 25, 2009, pp. 370-373.

\* cited by examiner

Ingredients. Our protocol requires the following ingredients:
- A $(n,t)$-DPRF protocol $\mathsf{DP} = (\mathsf{DP.Setup}, \mathsf{DP.DEval})$.
- A pseudorandom generator $\mathsf{PRG}$ of $\mathsf{poly}(\kappa)$ stretch.
- A hash function $\mathsf{H}: \{0,1\}^* \to \{0,1\}^\kappa$ modeled as a random oracle.

$\mathsf{Setup}(1^\kappa) \to ([\mathsf{sk}]_{[n]}, pp):$ Run $([\mathsf{rk}]_{[n]}, pp) \leftarrow \mathsf{DP.Setup}(1^\kappa);$ set $[\mathsf{sk}]_{[n]} := [\mathsf{rk}]_{[n]}$.

$\mathsf{DistEnc}([\mathsf{sk}]_S, [j':m], pp) \to c:$ Party $j$ wants to encrypt a message $m$:
- Party-$j$ computes $\alpha \leftarrow \mathsf{H}(m, \rho)$ with a uniformly random nonce $\rho$. It then sends the pair $(j, \alpha)$ to all parties in $S$.
- Every party in $S$ except $j$ checks if $(j, \alpha)$ is indeed coming from $j$. If this check fails for any party, it returns $\bot$. Then set $c := \bot$. Otherwise go to the next step.
- All parties in $S$ collectively run an instance of the DPRF evaluation to get: $[j:w/\bot] \leftarrow \mathsf{DP.DEval}([\mathsf{rk}]_S, j, (j\|\alpha), pp)$. If the output is $\bot$ set $c := \bot$; otherwise party-$j$ computes $e := \mathsf{PRG}(w) \oplus (m\|\rho)$ and then $c := (j, \alpha, e)$.
- Output $[j:c]$.

$\mathsf{DistDec}([\mathsf{sk}]_S, [j':c], pp) =: [j':m/\bot]:$ To decrypt a ciphertext $c$, party-$j'$ first parses $(j, \alpha, e) := c$. Then it sends $(j, \alpha)$ to the parties in $S$.
- All parties in $S$ run an instance of the DPRF evaluation to get:
  - $(j':w) \leftarrow \mathsf{DP.DEval}([\mathsf{rk}]_S, j', (j\|\alpha), pp)$. If the output is $\bot$ set $c := \bot$; otherwise go to the next step.
- Then party $j'$ computes $m\|\rho := \mathsf{PRG}(w) \oplus e$. Then check if $\alpha = \mathsf{H}(m, \rho)$. If this check fails set $m := \bot$.
- Output $[j':m]$.

*FIG. 7*

Parameters: Let $G = \langle g \rangle$ be a multiplicative cyclic group of prime order $p$ in which the DDH-Assumption holds and $H : \{0,1\}^* \to G$ be a hash function. Let SSS be Shamir's secret sharing scheme (Definition 7) and NIZK be a non-interactive zero-knowledge proof system (Definition 9).

- Setup($1^\kappa, n, t$) $\to$ ($[\![sk]\!]_{[n]}, pp$) : Sample $s \xleftarrow{\$} \mathbb{Z}_p$ and get $([\![s]\!]_{[n]}) \leftarrow$ SSS($n, t, p, s$). Run NIZK.Setup($1^\kappa$) to get a CRS $\sigma$. Output $([\![s]\!]_{[n]}, (G, \sigma))$.

- DEval($[\![sk]\!]_S, j, x, pp$) $\to$ $[j : y]$ : If $|S| < t$, output $\perp$. Else,
  - For $i \in S$, party $i$ sends to party $j$:
    * $h_i := w^{sk_i}$, where $w := H(x)$;
    * a NIZK proof $\pi_i$ of the statement that $\log_g g_i = \log_w h_i$ in the group $G$ using $sk_i$ as the witness.
  - Party $j$ outputs $\perp$ if $\pi_i$ does not verify for any $i \in S$. Otherwise, it outputs $y := \prod_{i \in S} h_i^{\lambda_{i,S}}$ where $\lambda_{i,S}$ are the Lagrange coefficients for $S$.

*FIG. 8*

Parameters: Let $f : \{0,1\}^\kappa \times \{0,1\}^* \to \{0,1\}^*$ be a pseudo-random function. Let NIZK be a non-interactive zero-knowledge proof system (Definition 9).

- Setup($1^\kappa, n, t$) $\to$ ($\{[sk]_{[n]}, pp\}$) : Pick $k_1, \ldots, k_d \leftarrow \{0,1\}^\lambda$ where $d := \binom{n}{n-t+1}$. Let $D_1, \ldots, D_d$ be the $d$ distinct $(n-t+1)$-sized subsets of $[n]$. For $i \in [n]$, let $sk_i = \{k_j \mid i \in D_j \text{ for } j \in [d]\}$. Run NIZK.Setup($1^\kappa$) to get a CRS $\sigma$. Output ($\{[sk]_{[n]}, (\sigma)\}$).
- DEval($[sk]_S, j, x, pp$) $\to \{j : y\}$ : If $|S| < t$, output $\perp$. Else,
  * For $i \in S$, party $i$ sends to party $j$
    * $h_{i,k} := f_k(x)$ for all $k \in sk_i$.
    * a NIZK proof $\pi_i$ of the statement that all $h_{i,k}$ were computed correctly using $sk_i$ as the witness.
  * Party $j$ outputs $\perp$ if $\pi_i$ does not verify for any $i \in S$. Otherwise, it defines mutually disjoint sets $\{SK_i\}_{i \in S}$ such that $\cup_{k \in S} SK_k = \{k_1, \ldots, k_d\}$ and $SK_i \subseteq sk_i$ for every $i$. Then, it outputs $\oplus_{k \in SK_i, i \in S} h_{i,k}$.

*FIG. 9*

| t | n | Throughput (cnc/s) | | | Latency (ms) | | | Bandwidth (Throughput Mbps) | | |
|---|---|---|---|---|---|---|---|---|---|---|
| | | $W_{AES}$ | $W_{DDH}$ | $F_{DDH}$ | $W_{AES}$ | $W_{DDH}$ | $F_{DDH}$ | $W_{AES}$ | $W_{DDH}$ | $F_{DDH}$ |
| $n/3$ | 6 | 1,085,770 | 536 | 232 | 0.1 | 4.6 | 9.3 | 268 | 0.14 | 0.29 |
| | 12 | 656,728 | 382 | 90 | 0.3 | 4.4 | 15.9 | 481 | 0.28 | 0.37 |
| | 18 | 45,434 | 297 | 64 | 0.6 | 5.4 | 21.5 | 55 | 0.30 | 0.40 |
| | 24 | 902 | 173 | 34 | 7.5 | 11.2 | 30.4 | 2 | 0.30 | 0.30 |
| $n/2$ | 4 | 1,113,000 | 545 | 235 | 0.1 | 4.7 | 9.2 | 272 | 0.13 | 0.30 |
| | 6 | 510,152 | 527 | 145 | 0.2 | 4.0 | 11.9 | 240 | 0.26 | 0.36 |
| | 12 | 198,020 | 300 | 64 | 0.7 | 5.2 | 21.2 | 242 | 0.37 | 0.40 |
| | 18 | 10,104 | 231 | 42 | 1.1 | 8.0 | 31.3 | 20 | 0.45 | 0.42 |
| | 24 | 165 | 125 | 22 | 38.0 | 15.9 | 34.5 | 0 | 0.33 | 0.30 |
| $2n/3$ | 3 | 1,100,413 | 561 | 230 | 0.1 | 3.9 | 10.7 | 269 | 0.14 | 0.30 |
| | 6 | 1,083,592 | 380 | 101 | 0.4 | 4.2 | 15.0 | 757 | 0.20 | 0.38 |
| | 12 | 438,957 | 245 | 47 | 1.1 | 6.4 | 27.0 | 750 | 0.42 | 0.42 |
| | 18 | 21,139 | 176 | 31 | 1.6 | 8.9 | 41.6 | 57 | 0.47 | 0.43 |
| | 24 | 445 | 100 | 17 | 16.5 | 21.5 | 72.4 | 2 | 0.37 | 0.32 |
| $n-2$ | 4 | 1,113,000 | 545 | 235 | 0.1 | 4.7 | 9.2 | 272 | 0.13 | 0.30 |
| | 6 | 1,083,592 | 380 | 101 | 0.4 | 4.2 | 15.0 | 757 | 0.20 | 0.38 |
| | 12 | 727,273 | 203 | 57 | 1.4 | 7.37 | 33.1 | 1508 | 0.45 | 0.42 |
| | 18 | 524,109 | 135 | 23 | 2.2 | 12.6 | 55.2 | 1910 | 0.49 | 0.43 |
| | 24 | 283,822 | 78 | 12 | 5.6 | 28.0 | 98.0 | 1456 | 0.38 | 0.32 |
| 2 | 4 | 1,113,000 | 555 | 235 | 0.1 | 4.7 | 9.2 | 272 | 0.13 | 0.30 |
| | 6 | 1,085,770 | 556 | 235 | 0.1 | 4.6 | 9.3 | 268 | 0.14 | 0.30 |
| | 12 | 1,058,574 | 556 | 235 | 0.1 | 4.6 | 9.56 | 258 | 0.14 | 0.30 |
| | 18 | 1,037,703 | 553 | 226 | 0.1 | 4.6 | 9.6 | 253 | 0.14 | 0.28 |
| | 24 | 735,204 | 404 | 176 | 2.2 | 4.6 | 9.56 | 180 | 0.10 | 0.22 |

FIG. 10

| t | n | Throughput (enc/s) | | | Latency (ms) | | | Bandwidth (Throughput Mbps) | | |
|---|---|---|---|---|---|---|---|---|---|---|
| | | $W_{AES}$ | $W_{DDH}$ | $F_{ODH}$ | $W_{AES}$ | $W_{DDH}$ | $F_{DDH}$ | $W_{AES}$ | $W_{DDH}$ | $F_{DDH}$ |
| $n/3$ | 6 | 153,332 | 570 | 238 | 81.1 | 86.0 | 96.7 | 37 | 0.14 | 0.30 |
| | 12 | 51,745 | 399 | 103 | 81.2 | 88.4 | 111.7 | 38 | 0.29 | 0.39 |
| | 18 | 31,086 | 303 | 65 | 81.5 | 90.3 | 125.9 | 38 | 0.37 | 0.41 |
| | 24 | 775 | 191 | 30 | 86.5 | 90.7 | 132.2 | 1 | 0.33 | 0.31 |
| $n/2$ | 4 | 150,783 | 571 | 230 | 81.1 | 86.1 | 96.9 | 37 | 0.14 | 0.30 |
| | 6 | 76,957 | 536 | 150 | 81.2 | 86.4 | 103.2 | 38 | 0.26 | 0.35 |
| | 12 | 30,937 | 207 | 65 | 82.1 | 90.7 | 125.9 | 38 | 0.36 | 0.41 |
| | 18 | 11,776 | 235 | 42 | 82.2 | 92.4 | 141.2 | 23 | 0.46 | 0.43 |
| | 24 | 166 | 132 | 24 | 102.3 | 96.8 | 146.1 | 0 | 0.36 | 0.33 |
| $2n/3$ | 3 | 150,965 | 555 | 238 | 81.2 | 86.5 | 97.1 | 37 | 0.14 | 0.30 |
| | 6 | 51,535 | 396 | 103 | 81.7 | 88.5 | 112.2 | 38 | 0.29 | 0.39 |
| | 12 | 21,484 | 244 | 45 | 81.4 | 93.4 | 123.0 | 37 | 0.42 | 0.40 |
| | 18 | 14,020 | 174 | 31 | 82.5 | 97.9 | 156.2 | 38 | 0.47 | 0.43 |
| | 24 | 446 | 101 | 17 | 92.8 | 96.6 | 164.1 | 2 | 0.37 | 0.33 |

*FIG. 11*

MULTI-PARTY THRESHOLD AUTHENTICATED ENCRYPTION

CROSS REFERENCE TO RELATED APPLICATIONS

This application is a continuation application U.S. Ser. No. 16/652,782, filed Apr. 1, 2020, titled "MULTI-PARTY THRESHOLD AUTHENTICATED ENCRYPTION", which is a 371 patent application of International Application No. PCT/US2017/059073, filed on Oct. 30, 2017, titled "MULTI-PARTY THRESHOLD AUTHENTICATED ENCRYPTION", which are herein incorporated by reference in their entirety for all purposes.

BACKGROUND

The proliferation of new internet connected devices has provided people with new, interesting, and convenient ways to interact with the world around them, however, the "Internet of Things" also presents new security risks. Every new device presents a new access point with an attack surface and vulnerabilities which a hacker or malicious user could use to compromise network communications or personal data.

Multi-party encryption, using a shared or distributed "secret key" is one technique used to encrypt sensitive data before transmitting it through a network such as the Internet. A cryptographic key is split up into a number of "key shares," which are each distributed to a number of devices or servers. Later, an encrypting device (which may store one of the shares) can retrieve a smaller number of the key shares from the other devices. The encrypting device can then reconstruct the secret key using the retrieved key shares for use in encryption/decryption. Such a key sharing process can prevent an attacker from easily obtaining the shared secret at rest, i.e., because the secret key is not stored in long term memory.

However, such a reconstruction of key shares is susceptible as an attacker could obtain the secret key after it is reconstructed. Another technique, secure multi-party computation (MPC) can be used to encrypt or decrypt a message with a distributed secret key without reconstructing the secret key from the key shares. However, such protocols usually rely on garbled circuits, or other computationally intensive methods. Thus, they are not efficient for practical applications.

In many applications, asymmetric multi-party encryption techniques cannot be applied because of speed and throughput requirements. Pure asymmetric cryptography can be three to five orders of magnitude slower than symmetric cryptography. As a result, asymmetric cryptography cannot be used in high volume applications, where thousands of messages need to be encrypted or decrypted over short time intervals.

Thus, there is a need for new methods of distributed encryption.

SUMMARY

Embodiments of the invention provide for a distributed network of servers or devices, such as laptop computers, desktop computers, smart phones, etc., that may encrypt or decrypt messages without revealing secret shares to the other devices in the network. As long as less than the threshold number of devices do not collude, a hacker or malicious user is unable to compromise encryption keys used to encrypt or decrypt messages. This presents a security advantage over methods of multi-party encryption where the shared secret is explicitly reconstructed in its entirety.

Instead of reconstructing the shared secret, each of a number of different devices storing a different secret share of some total number of secret shares can perform a partial computation and send it to an encrypting device. The encrypting device may use those partial computations to generate an encrypted message without having to explicitly generate the shared secret that ultimately governs the encryption process.

One embodiment is directed to a method for encrypting a message performed at an encrypting device, the method comprising: generating a random nonce; generating a commitment message based upon the message and the random nonce; selecting a plurality of cryptographic devices from a network of cryptographic devices, the plurality of cryptographic devices respectively storing a plurality of secret shares that are generated from a secret value; transmitting the commitment message to the plurality of cryptographic devices; receiving, from each of the plurality of cryptographic devices, a plurality of partial computations corresponding to a key generation seed, the partial computations being generated using the secret shares and the commitment message; generating the key generation seed based on the plurality of partial computations; generating a cryptographic key based upon the key generation seed; encrypting, using the cryptographic key, the message and the random nonce to produce a ciphertext message; and generating a ciphertext payload comprising the commitment message and the ciphertext message.

Another embodiment is directed to a method for decrypting a ciphertext message performed at a decrypting device, the method comprising: parsing a ciphertext payload to produce a first commitment message, and a ciphertext message; selecting a plurality of cryptographic devices from a network of cryptographic devices, the plurality of cryptographic devices respectively storing a plurality of secret shares that are generated from a secret value; transmitting the first commitment message to the plurality of cryptographic devices; receiving, from each of the plurality of cryptographic devices, a plurality of partial computations corresponding to a key generation seed, the partial computations being generated using the secret shares and the first commitment message; generating the key generation seed based upon the plurality of partial computations; generating a cryptographic key based upon the key generation seed; and decrypting, using the cryptographic key, the ciphertext message to produce a message and a random nonce.

Other embodiments are directed to systems and computer products configured to perform the above methods.

Some instantiations of the method according to embodiments of the invention have achieved a throughput of up to one million encryption or decryption operations a second, or alternatively a sub-millisecond latency with up to eighteen participating encrypting or decrypting parties.

Prior to discussing specific embodiments of the invention, some terms may be described in detail.

TERMS

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

The term "cryptographic key" may refer to something used in encryption or decryption. A cryptographic key could, for example, refer to a product of two large prime numbers. A cryptographic key may be used in a cryptosystem such as RSA (Rivest, Shamir, Adleman) or AES (Advanced Encryption Standard), and may be used to encrypt plaintext and produce a ciphertext output, or decrypt ciphertext and produce a plaintext output. Cryptographic keys may be symmetrical, in which case the same key is used for encryption and decryption, or asymmetrical, in which case different keys are used for encryption and decryption.

The term "plaintext" may refer to text that is in a plain form. For example, this may refer to text that is readable by a human or a computer without any processing, such as the phrase "hello, how are you?" It may also refer to text that is in an unencrypted form. Numbers or other symbols may also qualify as plaintext.

The term "ciphertext" may refer to text that is in an encrypted form. For example, this could refer to text that must be decrypted before it is readable by a human or computer. Ciphertext may be generated by any number of cryptographic algorithms or cryptosystems, such as RSA or AES.

A "cryptographic device" may refer to any device that may perform cryptographic operations, including encryption and decryption. Examples of cryptographic devices include desktop computers, laptops, servers, smartphones, smart watches, or other portable electronic devices. A cryptographic device may possess a "secret," or "secret share."

A "proxy device" may refer to a device which may communicate or perform operations with other cryptographic devices as part of a cryptographic operation. A proxy device may also be referred to as a "hub device," a device which may communicate with a multitude of other cryptographic devices as part of a cryptographic operation. A proxy device may also communicate with a multitude of other, non-cryptographic devices. Further, a proxy device may itself be a cryptographic device, and as such may possess a "secret," or "secret share."

The term "multi-party computation" may refer to a computation that is performed by multiple parties. Each party, such as a server or computer, may have some inputs to the computation. For example, one party might know the length of one side of a rectangle and another party may know the length of another side. The two parties could perform a multi-party computation to determine the area of the rectangle.

The term "secure multi-party computation" may refer to a multi-party computation that is secure. In many cases, this refers to a multi-party computation in which the parties do not share information or other inputs with one another. As an example, two parties may wish to know which one of them is more wealthy, without revealing their wealth to each other. The two parties could use a secure multi-party computation technique, such as garbled circuits in order to accomplish this.

A "secret" may refer to a value or thing kept hidden as part of a cryptographic process. The security of the cryptographic process may rely on the secret only being known to only a few parties. For example, a secret may be a cryptographic key. Exposure of the secret may allow parties other than the intended parties to encrypt or decrypt messages.

A "shared secret" may refer to a secret value or thing shared between multiple parties. For example, a shared secret may be a cryptographic key, divided up such that multiple parties each possess a fraction of that cryptographic key. For instance, a 128 bit cryptographic key may be divided among 8 parties, such that each party holds 16 bits of the cryptographic key.

A "secret share" may refer to a value derived from a shared secret. As an example, a secret share may be the first 12 bits of a secret value. A secret share may also be a secret value binary exclusive-OR with a number. A secret share may in some instances be combined with a number of other secret shares in order to reproduce a secret.

A "hash function" may refer to any function that can be used to map data of arbitrary size to data of fixed size. Hash functions may be used to perform rapid data lookup. They may also be used to hide or obscure data by replacing it with its corresponding "hash value." For example, a long message may be converted using a hashing algorithm to a 256-bit sequence. If the hashing function is "collision resistant," meaning that it is difficult to find two messages that hash out to the same value, a hashing algorithm can be used to create a "commitment message," a message that may be used to verify that an encrypted message has not been tampered with.

A "commitment message" may refer to a message that may be used to verify that a course of action has been committed to. In a cryptographic context, a commitment message may refer to a message that may be used to verify that an encrypted message was not tampered with. Before a message is encrypted, a commitment message can be produced based on the message, e.g., via a hash function. This commitment message can be sent alongside the encrypted message. Once the message is decrypted, the recipient can generate its own commitment message in the same manner. The received commitment message and the generated commitment message can be compared to verify a match.

A "pseudorandom function" may refer to a deterministic function that produces an output that appears random. Pseudorandom functions may include hash functions, especially collision resistant hash functions, as well as elliptic curve groups. A pseudorandom function may approximate a random oracle, an ideal cryptographic primitive that maps an input to a random output from its output domain. A pseudorandom function can be constructed from a pseudorandom number generator.

A "random nonce" or "cryptographic nonce" may refer to an arbitrary number that may only be used a limited number of times. A random nonce may be randomly or pseudorandomly generated, and may be used in a cryptographic hash function. A random nonce may prevent some forms of cryptographic attack, such as "replay attack."

A "non-interactive zero-knowledge proof of knowledge" may refer to a zero-knowledge proof of knowledge in which no interaction is necessary between a proving entity and a verifying entity. A "zero-knowledge proof of knowledge" is a method by which a proving entity can prove the knowledge of a secret for which a statement is true to a verifying entity, without revealing any additional information about the secret. A non-interactive zero-knowledge proof of knowledge may be used to verify the accuracy or performance of a computation.

A verification value may refer to a value used to verify a computation, fact, or knowledge. An example of a verification value is a non-interactive zero-knowledge proof of knowledge, as discussed above. A verification value may be used to verify the accuracy or performance of a computation.

BRIEF DESCRIPTION OF THE DRAWINGS

FIG. 7 shows pseudocode for threshold authenticated encryption and decryption protocols according to some embodiments.

FIG. 8 shows pseudocode for a decisional Diffie-Hellman assumption based distributed pseudorandom evaluation function according to some embodiments.

FIG. 9 shows pseudocode for a distributed pseudorandom evaluation function for any distributed pseudorandom function, such as the advanced encryption standard, according to some embodiments.

FIG. 10 shows local area network based experimental results relating to throughput, latency, and bandwidth at different total numbers of devices and threshold numbers of devices for three protocols according to some embodiments.

FIG. 11 shows wide area network based experimental results relating to throughput, latency, and bandwidth at different total numbers of devices and threshold numbers of devices for three protocols according to some embodiments.

DETAILED DESCRIPTION

Figure 1:
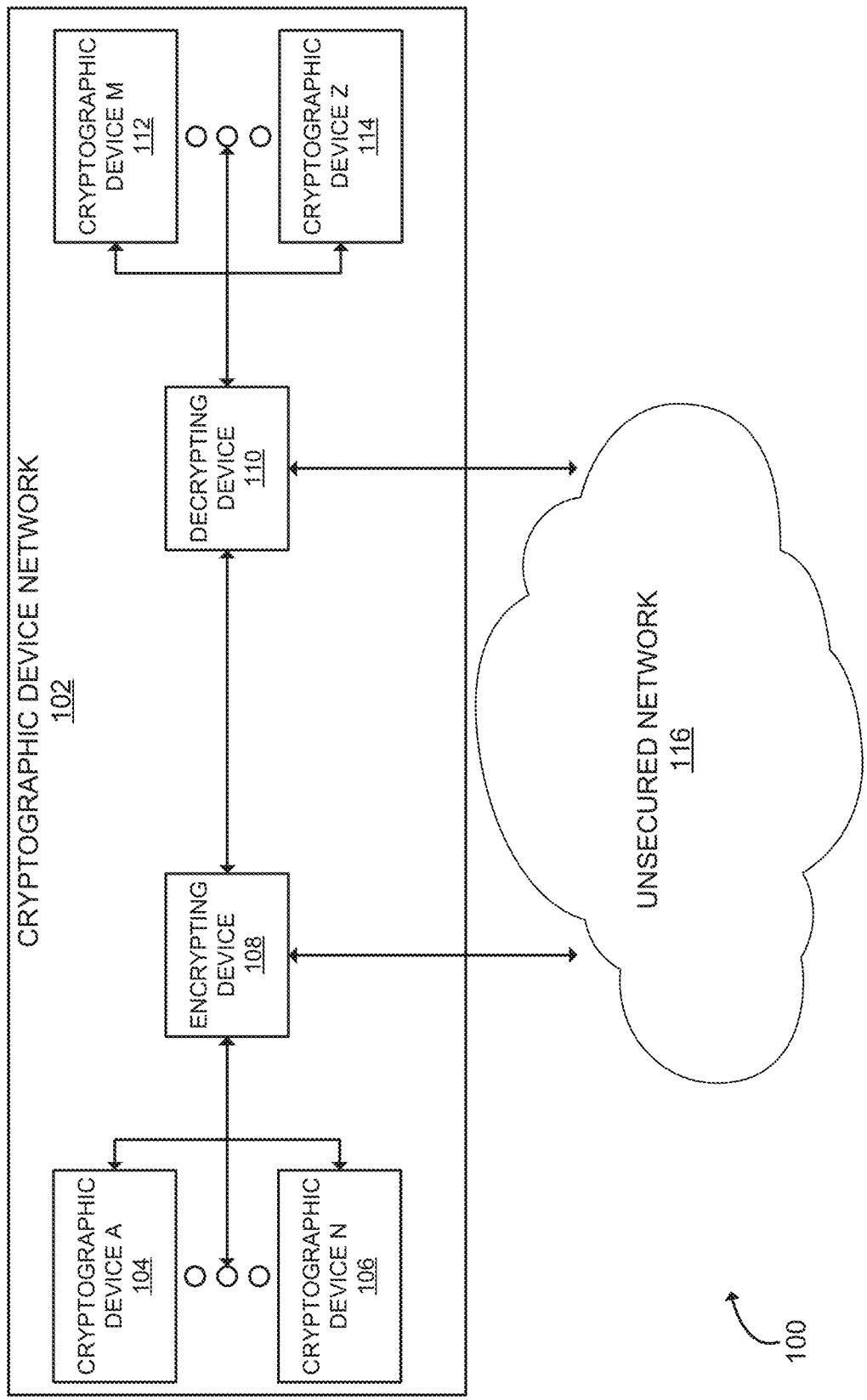
FIG. 1 shows a system level block diagram of a cryptographic device network and an unsecured network according to some embodiments.

Systems and methods according to embodiments enable threshold authenticated encryption, a process by which a number of devices collectively encrypt and decrypt data. Data may be encrypted or decrypted if a threshold number of devices, out of a larger total number of devices, participate in the encryption or decryption operation.

Embodiments make use of secret sharing and secret values as part of cryptographic operations. A secret value may be a secret number shared among a number of cryptographic devices. Each device receives a single, distinct "secret share," a value derived from the secret value. In order to determine the secret value, a party needs to collect a certain threshold number of secret shares.

Simple secret sharing methods require all of the shares to be present to reproduce the cryptographic key. Often times, cryptographic devices are not available, either due to maintenance or networking issues. If a cryptographic device is unable to provide its secret share, the cryptographic protocol cannot be used. As a result, these secret sharing schemes have little applicability.

Embodiments make use of more robust "threshold" encryption. Rather than all secret shares being necessary to perform a cryptographic operation, only a threshold number of secret shares are required. As an example, if there are twenty total secret shares, only eight may be required for the encryption process. This is commonly referred to as "m-out-of-n" encryption, where m refers to the threshold number of secret shares, in this case eight, and n refers to the total number of secret shares, in this case twenty.

As a simple example, consider a two-out-of-three encryption process. The secret value could be split up into three values: A, B, and C. Each secret share could be two of those values, as an example, the first secret share could be {A, B}, the second secret share could be {A, C} and the third secret share could be {B, C}. In this way the secret value {A, B, C} can be reproduced from at least two secret shares.

In some embodiments, the secret shares can be used to reproduce the secret value via a mathematical relationship. As an example, the secret value could be a specific coefficient of a polynomial, and the secret shares could be distinct points on the polynomial. It is possible, given enough known points (secret shares) to determine the specific coefficient of the polynomial (secret value). In this way the secret shares can be used to reproduce the shared secret.

However, reproduction of the shared secret is itself undesirable from a cryptographic standpoint. If the shared secret is reproduced, it means that an adversary has an opportunity to determine the shared secret. If an adversary determines the shared secret, the adversary has the capability to follow the cryptographic protocol and encrypt or decrypt messages at will.

To this end, the method according to embodiments provides additional measures to secure the shared secret, including the use of distributed pseudorandom functions. The method according to embodiments may be better understood in view of the summary below A cryptographic device (interchangeably referred to as an "encrypting device" or "decrypting device," depending on whether the system is performing encryption or decryption operations) may select a threshold number or one less than a threshold number of other cryptographic devices, such that including the cryptographic device itself, a threshold number of devices are included in the cryptographic process. The encrypting device may generate a random nonce. From the random nonce and a message to encrypt, the encrypting device may generate a commitment message using a pseudorandom function, such as an elliptic curve cryptography (ECC) based pseudorandom function, or one based on any pseudorandom function, such as the advanced encryption standard (AES). The commitment message may later be used to verify that the encryption process was completed successfully. The commitment message and a encrypting device identifier (interchangeably referred to as a device identifier, or "identification value") are transmitted to each of the selected cryptographic devices, which may each operate on the commitment message, using their respective secret shares to each produce a partial computation. The encrypting device itself may also produce a partial computation, using its own secret share and the commitment message.

The resulting partial computations are transmitted back to the encrypting device, which then may combines the partial computations to produce a key generation seed. From the key generation seed, the encrypting device may generate a cryptographic key using a pseudorandom number generator that may be used to encrypt a message along with the random nonce, producing a ciphertext message. The encrypting device then generates a ciphertext payload using the device identifier, the commitment message, and the ciphertext message.

The decryption process features many of the same characteristics as the encryption process. A decrypting device receives a ciphertext payload and may separates out the device identifier, the encrypted message, and the commitment message. The decrypting device selects one less than a threshold number of other cryptographic devices from a network of cryptographic devices, then may transmit the device identifier and commitment message to those devices. Each selected cryptographic device may use their secret share and the commitment message to produce a partial computation that is then transmitted back to the decrypting device. The decrypting device itself may also produce a partial computation. The decrypting device combines these partial computations to produce a key generation seed.

The decrypting device may use the key generation seed to produce a cryptographic key using a pseudorandom number generator. The decrypting device may then use that cryptographic key in order to decrypt the encrypted message, creating a plaintext message and the random nonce. The plaintext message and the random nonce may be used to produce a commitment message, which may then be compared to the commitment message parsed from the ciphertext payload. The decrypting device may terminate or provide some indication of encryption or decryption failure if the commitment message does not match the commitment message parsed from the ciphertext payload.

Systems and methods according to embodiments are discussed below, along with some background when necessary.

I. Multi-Party Cryptographic Network

A. System Block Diagram

FIG. 1 shows a block diagram of a system 100 according to some embodiments. The system 100 may include a cryptographic device network 102, along with an unsecured network 116.

The cryptographic device network 102 can be composed of a number of cryptographic devices. A cryptographic device is a device capable of performing the cryptographic operations necessary to perform threshold authenticated encryption methods according to some embodiments. Cryptographic devices will be discussed in more detail below with reference to FIG. 2. Explicitly shown are six cryptographic devices, cryptographic device A 104, cryptographic device N 106, encrypting device 108, decrypting device 110, cryptographic device M 112, and cryptographic device Z 114.

While only six cryptographic devices are shown, there are two implied groups of cryptographic devices: those involved in the encryption process (cryptographic device A 104 through cryptographic device N 106) and those involved in the decryption process (cryptographic devices M 112 through cryptographic device Z 114). Further, while the implicit "encrypting group" and "decrypting group" are shown separately, a cryptographic device can belong to each group at different times. Likewise, a different cryptographic device can serve as the encrypting device 108 or the decrypting device 110 during different cryptography operations.

An encryption operation may be initiated by a single cryptographic device. This cryptographic device may possess a message that needs to be encrypted. As an example, a cryptographic device such as a laptop computer may possess a message, such as a sensitive medical record or a credit card number. This particular cryptographic device serves as the encrypting device 108. The encrypting device selects a number of other cryptographic devices among the devices in the cryptographic device network 102. These cryptographic devices serve as part of the encrypting group, comprising cryptographic device A 104 through cryptographic device N 106.

Likewise, during a decryption operation, a single cryptographic device initializes the decryption operation and serves as decrypting device 110. The decrypting device 110 selects a number of other cryptographic devices that serve as part of the decrypting group, comprising cryptographic device M 112 through Z 114.

The cryptographic devices may communicate to one another through any suitable means, and using any suitable standard or protocol. As an example, the encrypting device 108 may interface with cryptographic device A 104 via a wired interconnection, such as a connected USB hub. As another example, the cryptographic devices may communicate to one another through an Ethernet interface, or via an I2C interface. Still further, the cryptographic devices may interface wirelessly, such as through near field communication (NFC), Wi-Fi, or Bluetooth. As yet another example, the cryptographic devices in the cryptographic device network may communicate via a communications network such as the Internet or a cellular network.

In some embodiments, communications between the cryptographic devices may be mediated through a hub device or a proxy device. This device may simplify communications between the cryptographic devices, decreasing the total number of messages that may need to be transmitted between cryptographic devices. Additionally, if a hub is used, a given cryptographic device does not necessarily need to know how to communicate with another cryptographic device in the cryptographic device network. As long as the given cryptographic device is able to communicate with the hub or proxy device, it may be possible for that cryptographic device to communicate with any other cryptographic device. The encrypting device 108 or decrypting device 110 may not need to know, identify, or directly communicate with the other cryptographic devices. Instead, the hub or proxy device may search among, and select the other cryptographic device on behalf of the encrypting device 108 or decrypting device 110.

The cryptographic devices may be organized in any number of networking structures comprising any number of hub or proxy devices. The following are intended only to be non-limiting examples, a person skilled in the art may conceive of any number of appropriate networking structures.

As a first example, the cryptographic devices could exist in a "chain" structure where each cryptographic device may communicate only with the one or two cryptographic devices or proxy devices adjacent to it in the chain. In this case, the encrypting device 108 or decrypting device 110 may only be able to communicate with the first cryptographic device or proxy device in the chain, which in turn communicates with the second cryptographic device or proxy device, and so forth.

As a second example, the cryptographic device network could be in the form of a "tree structure." In this structure, the encrypting device 110 may only be able to communicate with a first proxy device. The first proxy device may only be able to communicate with the encrypting device 110, and a few second proxy devices, and/or cryptographic devices. This "second layer" of devices may in turn only be able to communicate with the first proxy device and a "third layer" of cryptographic devices or proxy devices, such that the network "branches" outward from the first proxy device.

The encrypting device 108 and decrypting device 110 may also communicate with devices in an unsecured network 116. Examples of unsecured networks are any network of devices that a user has no control over or has limited trust in. As an example, the encrypting device 108 and decrypting device 110 may communicate with devices over an unsecured network such as the Internet.

For example, a user may possess a sensitive record that they want to store on a cloud server for later access. For instance, a user may be travelling to an unsafe area and wants to have their medical information with them in case they need to present it to a doctor. However, the user does not wish to have the medical information stored on a device such as a laptop, which may be stolen.

The user could use the encrypting device 108 (such as their laptop computer) to encrypt the sensitive record before storing it on their cloud server or drive over the Internet. When the user wishes to retrieve the information in the record, the user may download the encrypted record off the cloud server onto their decrypting device 110 (such as a cheap notebook or travel tablet). The record may then be decrypted as needed.

B. Cryptographic Device

Figure 2:
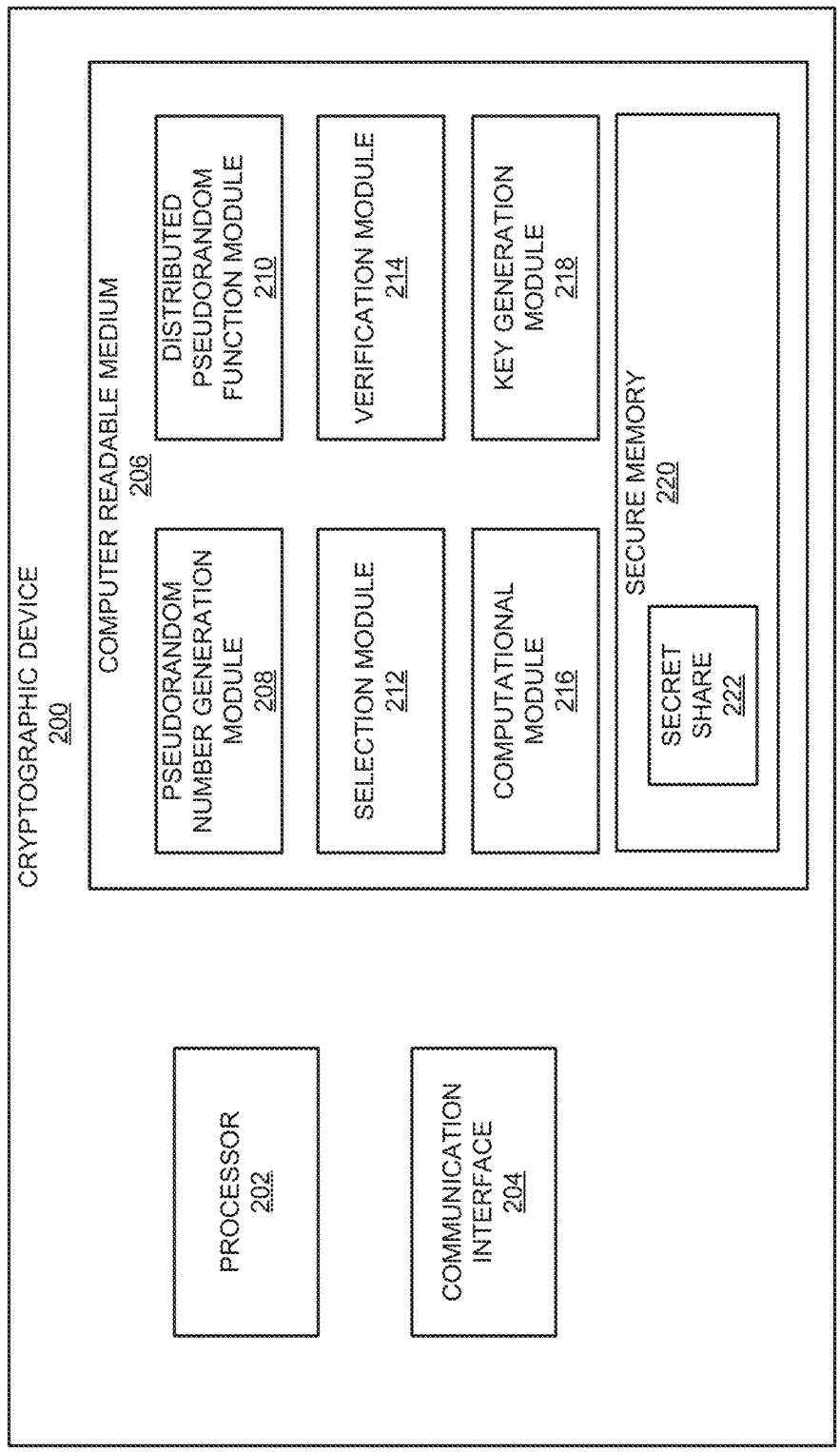
FIG. 2 shows a block diagram detailing components in a cryptographic device according to some embodiments.

FIG. 2 depicts a cryptographic device 200. While a cryptographic device 200 can take many different forms, such as a laptop computer, desktop computer, server, smart phone, tablet, or smart watch, among others, a cryptographic device 102 according some embodiments has at least a processor 202, a communications interface 204 and a computer readable medium 206 including a number of software modules 208-218 and a secure memory 220 that stores a secret share 222.

1. Processing, Communicating, and Storing

The processor 202 may be any suitable data computation device or devices. The processor 202 may be able to interpret code or instructions stored on a computer readable medium in order to carry out operations. For example, the processor 202 may be a central processing unit (CPU) operating on a reduced instructional set. The processor 202 may be single-core or multi-core. The processor may include an arithmetic logic unit (ALU) and cache memory in order to perform functions or operations. The processor may be a collection of single-core and or multi-core processors or CPUs working collaboratively to perform operations.

The communications interface 204 is any interface by which the cryptographic device 200 may communicate with other devices or networks of devices. Examples of communication interfaces include wired interfaces, such as USB, Ethernet, or FireWire. Examples also include interfaces used for wireless communication, such as a Bluetooth or Wi-Fi receiver. Some cryptographic devices may possess multiple communications interfaces. As an example, a smartphone may communicate through a micro USB port, a cellular receiver, a Bluetooth receiver, and a Wi-Fi receiver.

The cryptographic device 200 may communicate with other cryptographic devices via one or more secure and authenticated point-to-point channels. These channels may be set up during an initialization phase (such as prior to generating secret shares, as discussed in Section II) using standard public-key infrastructure. For example, any pair of cryptographic devices 200 may exchange a symmetric key via their communications interfaces 204. This may be accomplished using a key exchange such as a Diffie-Hellman key exchange. As another example, asymmetric keys may be used. After the key exchange, the cryptographic devices may communicate over a public channel (such as an unsecured network) using a standard authenticated encryption scheme to encrypt any message with the key. Further authentication mechanisms can also be use, e.g., digital signatures.

The computer readable medium 206 may be a specialized piece of hardware or software that may possess code, data, or instructions that may be interpreted by the processor 202. The computer readable medium 206 may include a number of software modules that perform threshold authenticated encryption related functions. Included among these may be a pseudorandom number generation module 208, a distribute pseudorandom function module 210, a selection module 212, a verification module 214, a computational module 216, a key generation module 218, as well as a secure memory 220 containing a secret share 222.

2. Pseudorandom Number Generation Module

The pseudorandom number generation module 208 may include routines and subroutines in order to generate cryptographically secure pseudorandom numbers. This may include one or more pseudorandom number generation algorithms that meet the requirements for cryptographic security. These requirements may include passing statistical randomness tests, such as the next bit test, which requires that given the first k bits of a random sequence, no polynomial time algorithm can predict the (k+1)th bit of that sequence with probability of success non-negligibly better than 50%. It may also include "state compromise extension" tests, whereby a hypothetical adversary learning of some or all state variables of the pseudorandom number generator at time t will be unable to recreate the stream of random numbers prior to t. Examples of cryptographically secure pseudorandom number generators include the Yarrow, ChaCha20, and Fortuna algorithms, among others.

The pseudorandom number generation module 208 may additionally communicate with other modules or hardware in the cryptographic device 200 for the purpose of performing its intended function. As an example, the pseudorandom number generation module 208 may retrieve the system time (i.e., year, month, day, hour, etc.) in order to seed its pseudorandom number generation algorithm.

3. Distributed Pseudorandom Function Module

The distributed pseudorandom function module 210 may possess or include code for the purpose of evaluating pseudorandom functions (PRFs) or distributed pseudorandom functions (DPRFs). This may include cryptographic operations such as elliptic curve cryptography or evaluating or enacting other cryptosystems, such as block ciphers such as AES or hash functions such as SHA-2. As well as any and all necessary underlying mathematical operations.

As an example, the distributed pseudorandom function module 210 may possess code that may be used by the processor 202 in order to implement elliptic curve cryptography (ECC) under the decisional Diffie-Hellman (DDH) assumption, for the purpose of generating intermediate values used later in the method according to embodiments.

The decisional Diffie-Hellman assumption states that in a multiplicative group G of prime order p with generator g, that given $g^a$ and $g^b$, where a and b are randomly and independently choses from the group, $g^{ab}$ "looks" like a third random number selected from the group. In other words, there is no clear relationship between $g^a$, $g^b$ and $g^{ab}$.

While both ECC and DDH are known to one skilled in the art, the use of ECC will be explained briefly below for the purpose of explaining embodiments.

ECC, like many other cryptosystems, relies on mathematical problems which have computationally unfeasible solutions. With ECC, there is currently no efficient solution to the "elliptic curve discrete logarithm problem." Given an original point A on an elliptic curve, and a product point C on an elliptic curve, it is sufficiently difficult to determine a multiplicand B such that the point multiplication A*B=C holds. The practical result is as long as B is kept hidden, a message or data can be converted to an original point A, and point multiplied with B in order to produce a product point C. As long as B remains unknown, C will be unpredictable and "random" with reference to the known value of A.

An elliptic curve is any curve satisfying the equation $y^2=x^3+ax+b$. ECC is usually concerned with elliptic curves over finite fields, a field with a finite number of elements. An example of a finite field is integers mod p, where p is a prime number. An elliptic curve group may be defined by its order q, the number of elements within that group. ECC may be used to implement an approximation of a random oracle, a function that takes in an input and produces a consistent random output from its output domain.

Additionally, any multiplicative group G of prime order p in which DDH holds may be used in a DPRF. The PRF functionality being computed collectively can be written as $f_s(x)=H(x)^s$, where H: $\{0, 1\}^* \rightarrow G$ is a hash function (modeled as a random oracle) and the key is $s \in Z_p$. In the setup phase, a trusted party such as a trusted external server (see FIG. 3) samples a master key $s \leftarrow_s Z_p$ and uses Shamir's secret sharing with a threshold t to create n shares $s_1, \ldots, s_n$ of s. The share $s_i$ is given privately to the i-th cryptographic device. For any set of t cryptographic devices, $S:=\{i_1, \ldots, i_t\} \subseteq [n]$, there exists integers (Lagrange coefficients) $\lambda_{j,S} \in Z_p$ such that $\Sigma_{j=0}^t s_{i_j} \lambda_{j,S}=s$. Therefore it holds that:

$$f_s(x) = H(x)^s = H(x)^{\Sigma_{j=1}^t s_{i_j} \lambda_{j,s}} = \prod_{i=1}^t (H(x)^{s_{i_j}})^{\lambda_{j,s}}$$

This equation can be computed in a distributed manner, enabling threshold encryption and decryption operations according to embodiments of the invention. For more detail, see Section V below.

To put into context of embodiments, the processor 202 may use code possessed by the pseudorandom number generation module 208 in order to produce a random number. This random number may then be used by the processor 202, along with code or instructions contained within the distributed pseudorandom function module 210 in order to perform an ECC operation. The random number may be converted to a point on an elliptic curve, which may then be point multiplied by a secret multiplicand to produce a product point. This product point may be converted to an intermediate value as described above. Given the same input random number, and the same secret multiplicand, the intermediate value will be the same.

4. Selection Module

The selection module 212 may include code or instructions used by the processor 202 for selecting a predetermined threshold number of devices from the cryptographic device network. There are many methods and criterion by which the selection module 212 may direct selection of cryptographic devices. The following examples are intended to be non-limiting.

As an example, the selection module 212 may include code that randomly selects a threshold number of other cryptographic devices from the cryptographic device network. This could be accomplished by use of a sampling algorithm. The processor 202 could maintain a list with indexes or identification values corresponding to each other cryptographic device in the cryptographic device network. For example, with 10 cryptographic devices, the $9^{th}$ cryptographic device could maintain a list of {1, 2, 3, 4, 5, 6, 7, 8, 10}, corresponding to each cryptographic device in the cryptographic device network other than itself. The selection module 212 could comprise code which enables the processor 202 to randomly generate a number 1-9, add the corresponding index to a second list and remove it from the first list. As an example, if the processor 202 randomly generates the number 3, the first list would then consist of {1, 2, 4, 5, 6, 7, 8, 10} and the second list would include {3}. This process could be repeated, this time from 1-8, and subsequently from 1-7, and so forth for a threshold number of times. If the threshold number was four, for example, the processor 202 could select a number from 1-9 and the corresponding index, then 1-8, 1-7, and finally 1-6, generating a list of the indexes of the four selected devices. The processor 202 could then use the communication interface 204 in order to communicate with those devices as part of the selection process, using the code or instructions stored on the selection module 212.

Further, the selection module 212 may contain code that allows the processor 202 to make alternative selections. As an example, if by using the method above, the $1^{st}$, $4^{th}$, $5^{th}$, and $7^{th}$ cryptographic devices are selected, the processor 202 may establish communication with those devices via the communication interface 204. However, under some circumstances those devices may be unresponsive, for example, a device could be in a powered off state. Likewise, some of those selected cryptographic devices may be busy performing other operations, and may not be available to assist in threshold operated encryption. In that case, the selection module 212 may possess code or instructions that enable the processor to make an alternative selection. This could involve using sampling algorithms such as the sampling algorithm above.

Also, the selection module 212 may contain code that enables more advanced rule-based decision making regarding the selection of cryptographic devices. As an example, the selection module 212 may contain code that can produce a "threat score" associated with each other cryptographic device in the cryptographic device network. The threat score could indicate the probability of compromise or corruption of a given device, i.e., the likelihood that a hacker, adversary, or malicious user has some control over that device. In order to better preserve the cryptographic integrity of the system, the processor 202 could only select devices with a threat score below a certain value.

Likewise, the selection module 212 may contain code that enables the processor 202 to select devices based on current computational "load." that is, the processor 202 could communicate with other cryptographic devices via the communication interface 204 and poll or request statistics on how much work the cryptographic devices expect to perform in the near future. A cryptographic device such as a tablet may be in use streaming video for a user. In this case, the tablet may be unable to both stream video and perform cryptographic operations due to performance or hardware constraints. As a result, the processor 202 may select another cryptographic device, such as the user's desktop computer, which may not be currently in use.

As another example, the selection module 212 may include code that enables the processor 202 to select other cryptographic devices according to a selection schedule, e.g., selecting certain devices at a certain time and selecting other devices at other times.

5. Verification Module

The verification module 214 may contain code or other instructions that allows the processor 202 to compare confirmation values and commitment messages in order to determine whether or not the message was successfully or accurately encrypted. This may include routines and subroutines that enable the generation of confirmation values and commitment messages, and may include code implementing cryptographic operations.

This may, for example, include a secure hashing algorithm (SHA) such as SHA-256, that may be used to create a "hash" from an input value. When a message is decrypted by the cryptographic device 200, a commitment message could be produced as a hash of that message. This commitment message could be compared to the commitment message received in the cryptographic payload. A match indicates that the message encrypted during the encryption operation is the same as the message that was decrypted during the decryption operation.

The comparison itself could be accomplished with any number of comparison algorithms. As an example, the processor 202 could represent both commitment messages as a sequence of bits, then iterate through those bits until it finds two bits that do not match. If the processor 202 finds two bits that do not match, then the commitment messages do not match and verification fails. If the processor 202 reaches the end of the bit sequences without finding any mismatches, the processor 202 may conclude that the commitment messages match.

6. Computational Module

The computational module 216 may include code, instructions, routines, and subroutines that enable the processor 202 to perform necessary mathematical computations as either an encrypting device, decrypting device, or as a cryptographic device selected by another cryptographic device as part of an encryption or decryption operation.

This may include calculating partial computations, as well as receiving partial computations from other cryptographic devices via the communications interface, and combining or otherwise deriving a value from those partial computations. This may additionally include calculating coefficients for polynomial interpolation, such as Lagrange coefficients. The computational module 216 may additionally contain code or instructions to retrieve the secret share 222 from the secured memory as part of these computations.

As an example, the computational module 216 may include code or other instructions that enable the processor 202 to calculate exponentials or exponentials with modulus, as part of a distributed pseudorandom function (DPRF). The computational module 216 may allow the processor 202 to receive an intermediate value over the communications interface, retrieve the secret share 222 from secure memory 220 and calculate the intermediate value raised to the power of the secret share modulus another number (i.e., if the intermediate value is z and the secret share is k, calculating $z^k$ mod n).

Additionally, the computational module 216 may include code that enables the processor 202 to combine partial computations via one of a number of partial computation combination schemes. As an example, the computational module 216 may allow the cryptographic device 200 to collect a number of partial computations $p_i$ and determine the product of those partial computations: $\Pi_i\ p_i$. The computational module 216 may also include code that enables the processor 202 to perform exponentiation functions.

Further, the computational module 216 may include code that enables the calculation of Lagrange coefficients. These Lagrange coefficients may be used along with the secret shares 222 to determine the secret value or a value derived from the secret value in a system that makes use of a secret sharing scheme such as Shamir's secret sharing.

Shamir's secret sharing is intended only to be a non-limiting example of a secret sharing method that may be employed with embodiments of the invention. Other secret sharing methods may be employed. Consequently, the computational module 216 may include code that enables other mathematical calculations that may be necessary for other secret sharing methods.

Shamir's secret sharing is a method used to produce a number of secret shares, some threshold number of which may be used to determine a secret value. Shamir's secret sharing makes use of the fact that K points are needed to uniquely define a polynomial of degree K−1. Thus for m-out-of-n threshold authenticated encryption, a polynomial of degree m−1 may be used to conceal the secret value such that m points are needed to recreate the secret value. Each device may be given a unique value sampled from the polynomial as that device's secret share. For example, for a polynomial P(x), each of n devices may receive P(1), P(2), . . . , P(n) as their secret share respectively. From m of those shares, P(x) can be interpolated. From P(x), the secret value "encoded" into the polynomial can be produced.

Typically speaking, the secret value is stored in the polynomial as zeroth order coefficient. In other words, if a polynomial of degree m−1 is defined as $P(x)=a_0+a_1x+a_2x^2+\ldots+a_{m-1}x^{m-1}$, the secret value, S, will be equal to $a_0$ or P(0).

The secret value and the other coefficients may be generated in a number of ways. One such way is by using a cryptographically secure random number generator, such that each coefficient, $a_0$ through $a_{m-1}$ are randomly assigned a value within some range.

The polynomial P(x) may be determined using Lagrange interpolation, by which a Lagrange basis polynomial is calculated for each device and multiplied by the secret share held by that device. The sum of these products equals the polynomial P(x). The Lagrange basis polynomial $l_j(x)$ is defined as follows:

$$l_j(x) := \prod_{\substack{0 \le p \le k \\ p \ne j}} \frac{x - x_p}{x_j - x_p} \tag{1}$$

The polynomial P(x) relates to the Lagrange basis polynomials by the following formula:

$$P(x)=\Sigma_{j=0}^{k}P(x_j)l_j(x) \tag{2}$$

As the Lagrange basis polynomial for the zeroth order coefficient (the secret value) is independent of the value x, formula (1) can be altered as follows:

$$l_j := \prod_{\substack{0 \leq p \leq k \\ p \neq j}} \frac{-x_p}{x_j - x_p} \quad (3)$$

Thus the secret S can be given by the formula below:

$$S = \Sigma_{j=0}^{k} P(x_j) l_j \quad (4)$$

Therefore, in an implementation making use of Shamir's secret sharing, the computational module 216 may possess code or instructions that enable the processor 202 to perform some or all of the above calculations.

7. Key Generation Module

The key generation module 218 may possess code or instructions in order to enable the processor 202 to generate cryptographic keys from key-generation seeds.

Generation of cryptographic keys may be accomplished in a number of ways. As an example, for a block cipher based cryptosystem, such as AES, a key may be generated based on a "pass phrase" and a mode of operation. In a block cipher, cryptographic transformations are performed on "blocks" of data or fixed-length groups of bits. If the block length of a block cipher is four bits, for example, a twelve bit message such as "0101 0011 1111" must be broken up into at least three blocks, each comprising four bits. The mode of operation describes how to apply a cipher's single-block operation to encrypt or decrypt messages longer than a block.

Modes of operation are usually described in terms of three or four letter acronyms. One simple mode of operation is the electronic codebook (ECB) mode. In ECB, the message is broken up into blocks of the block length, and the cryptographic key is applied to each block in sequence. There are other more sophisticated modes of operation, such as cipher block chaining (CBC), counter (CTR), and output feedback (OFB). A key generation algorithm might be denoted by a sequence of letters or numbers, such as "aes-128-cbc," indicating that the algorithm takes in a passphrase or key-generation seed and produces a 128 bit key for an AES cryptosystem operating in cipher block chaining mode. Practically speaking, the key generation module 218 possesses code or instructions that enable the processor 202 to generate a cryptographic key based on a key-generation seed for any one of numerous key generation algorithms.

The secure memory 220 may be any memory, or allocated block of memory for which access to is limited. As an example, the secure memory 220 could be a continuous block of memory addresses that may only be read under a certain set of conditions. For example, a secure memory may only be accessed by the processor 202 when operating code contained in the computational module 216. In this way the secure memory is only accessed during the time at which the data stored on the secure memory (the secret share 222) is needed as part of the cryptographic operation.

The secret share 222 may be a value or sequence of values stored within the secure memory 220. The secret share 222 may be used by the processor 202 when performing cryptographic operation. The secret share 222 is stored in the secure memory 220 for the purpose of limiting access and concealing its value, such that an adversary, hacker, or malicious user cannot easily determine the secret share 222.

The cryptographic device 200 may possess additional interface, modules and hardware components. As an example, a laptop computer possesses a number of additional interfaces, including a user interface and keyboard, and possesses a number of other software modules related to the function of applications on the laptop computer. Thus the communication interface 202, computer readable medium 204, and the assorted modules and secure memory are intended to be a minimal example of a cryptographic device 200 according to embodiments.

II. Generating and Distributing Secret Shares

Before addressing the method according to embodiments, it is may be appropriate to discuss the generation and distribution of secret shares, which are a key feature in some embodiments of the invention.

Generating and distributing shared secrets according to embodiments can be accomplished in a number of different ways. For example, in implementations where a specific secret sharing methodology is employed (i.e., Shamir's secret sharing) generating and distributing shared secrets may function differently than if a different secret sharing methodology is employed. For the purposes of illustration, a non-limiting example of generation and distribution of shared secrets will be discussed below with reference to FIG. 3. It is assumed that one skilled in the art of cryptography may conceive other methods of initialization or distributing secret shares.

A. Secret Share Distribution System

Figure 3:
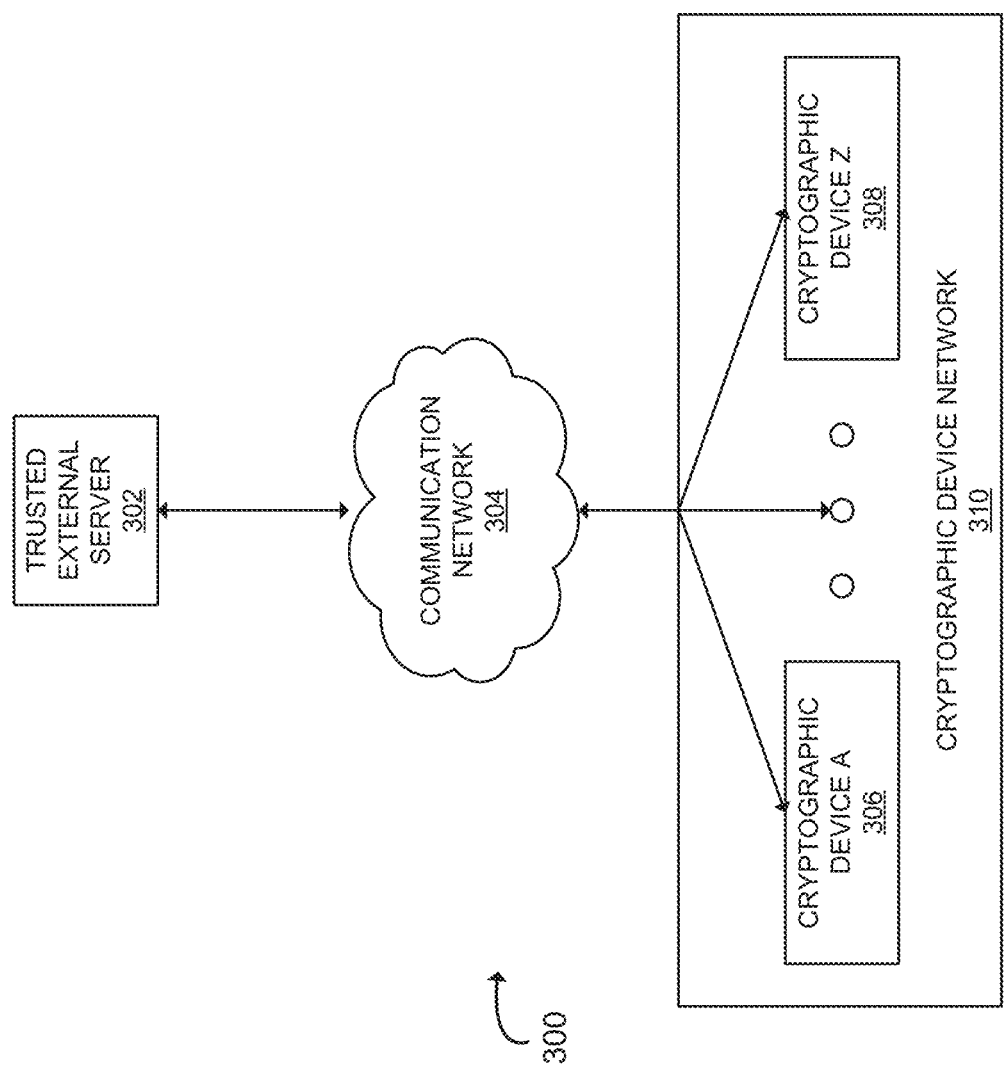
FIG. 3 shows a system level block diagram for a secret share provisioning process according to some embodiments.

FIG. 3 shows a system 300 consisting of a trusted external server 302, a communication network 304, and a cryptographic device network 310 comprising a number of cryptographic devices A 306 through Z 308. FIG. 3 shows one configuration by which secret shares could be distributed to cryptographic devices from the cryptographic device network 310 from a single trusted external server 302.

The trusted external server 302 could be a server or webserver capable of encrypted communication via a communication network 304. It may possess a processor and a computer readable medium, and may be capable of any operations necessary to generate a secret value or secret shares according to the methods above or other such methods. As an example, the trusted external server 302 may generate a number of random numbers using a cryptographically secure random number generator, interpret those random numbers as the coefficients of a polynomial P(x) and evaluate that polynomial for distinct values of x. The trusted external server 302 may also have the capability to establish secure communication with a number of cryptographic devices and transmit those distinct P(x) to those cryptographic devices.

The communication network 304 may comprise a network such as the Internet or a cellular communication network by which devices, computers, and servers can communicate with one another. The communication network 304 may be secure or unsecure.

The cryptographic device network 310 may be substantially similar to cryptographic device network 102 from FIG. 1, and may share many of the same properties described above. It may be composed of a number of cryptographic devices, each in operative communication with one another.

Cryptographic devices A 306 through Z 308 may be substantially similar to cryptographic devices A 104 through Z 114 from FIG. 1. Additionally, they be substantially similar to the cryptographic device 200 shown in FIG. 2. These cryptographic devices may possess a processor, communications interface, and computer readable medium with secure memory.

Figure 4:
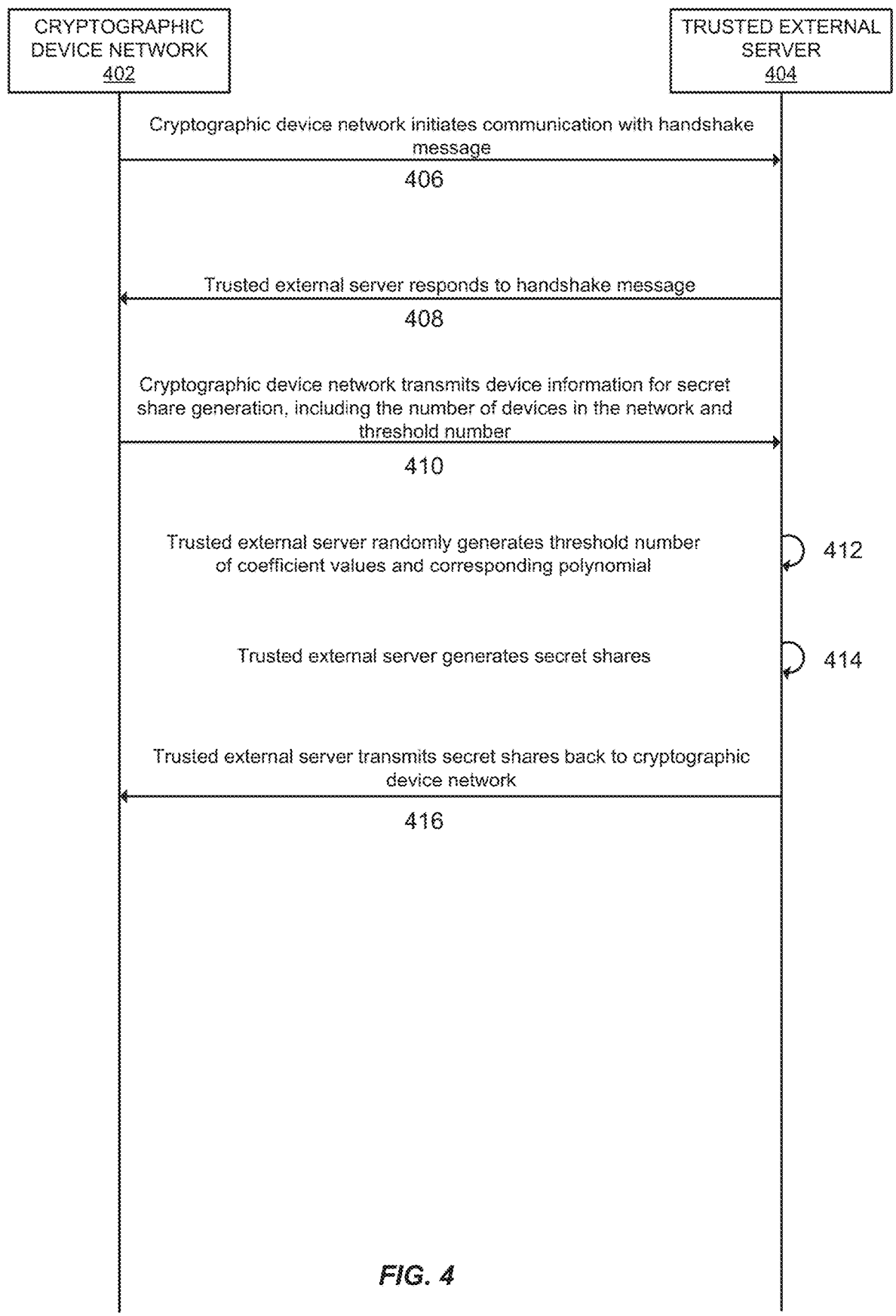
FIG. 4 shows a sequence diagram for the creation and provisioning of secret shares according to some embodiments.

FIG. 4 shows a sequence diagram detailing a method by which secret shares could be generated and distributed according to embodiments. The communications network 304 from FIG. 3 is not explicitly shown, however it is presumed that all communications between the cryptographic device network 402 and the trusted external server 404 flow through the communications network.

Steps 406 and 408 are two steps of a "handshaking" or communication establishment procedure between the cryptographic device network 402 and the trusted external server 404. Such a handshaking procedure is typical in many communication protocols, such as the transmission control protocol (TCP). This handshaking procedure may set out the rules for further communication. As an example, if further communications between the cryptographic device network 402 and the trusted external server 404 are to be encrypted, steps 406 and 408 could involve the transmission of encryption keys between the cryptographic device network 402 and the trusted external server 404.

For example, the trusted external server 404 could possess a public-private key pair. The cryptographic device network 402 could use the public key in order to encrypt a symmetric key on the cryptographic device 402 network side. This encrypted symmetric key could be transmitted to the trusted external server 404 in step 406. The trusted external server 404 could transmit an acknowledgement message back to the cryptographic device network 402 in step 408, encrypted using the symmetric key. Future communications between the cryptographic device network 402 and the trusted external server 404 (i.e., shown in steps 410 and 416) could be encrypted using this symmetric key.

At step 410 the cryptographic device network 402 may transmit information necessary to complete the secret share generation and distribution process. This could include information such as the number of devices in the cryptographic device network, the threshold number of devices for the cryptographic device network, the requested sample values (i.e., if twenty cryptographic devices request P(1), P(2), . . . , P(20), the sample values would be 1, 2, . . . , 20), and address information for each of the cryptographic devices in the cryptographic device network 402. As an example, the cryptographic device network 402 could transmit a series of packets, each containing the requested sample value, and the address, such as the IP address or MAC address for the cryptographic device requesting that sample value. Additionally, the packets may include information such as a TCP or UDP (user datagram protocol) port on which to communicate with the cryptographic device.

At step 412 the trusted external server 404 generates, in a cryptographically secure manner, a number of random numbers equal to the threshold number of cryptographic devices received from the cryptographic device network 402 in step 410. The trusted external server 404 selects one of these random numbers as the secret value, and each of the other random numbers as the first through (m−1)th, (where m is the threshold number) coefficients of a polynomial P(x) of degree m−1.

At step 414 the trusted external server 404 uses these generated coefficients and evaluates the polynomial P(x) for each of the requested sample values, generating the corresponding secret shares.

At step 416 the trusted external server 404 may encrypt and transmit the secret shares from step 414 to the respective cryptographic devices in the cryptographic device network 402 using the routing or address information provided in step 410. In this way each cryptographic device in the cryptographic device network 402 receives its own respective secret share.

This is only one example of a secret share generation and distribution process. There are numerous variations that may become apparent to one skilled in the art. As an example, each cryptographic device in the cryptographic device network 402 could possess its own symmetric encryption key, rather than the entire network possessing a single key.

As another example, the cryptographic devices could receive their respective secret shares via a cryptographic method such as oblivious transfer. As another example, the cryptographic device network 402 could generate the secret shares without the assistance of a trusted external server 404 at all, by using methods such as secure multi-party computation.

Further, in some embodiments, a given cryptographic device may not be provisioned or possess a secret share at all.

In a system which makes use of a hub or proxy device, the hub device or proxy device may itself possess a secret share.

B. Additional Cryptographic Devices

The above-noted method of generating and distributing secret shares according to embodiments enables the addition of new cryptographic devices to the cryptographic device network. An example process detailing the addition of new cryptographic devices is described below.

In order to be added to the cryptographic device network, a cryptographic device may be issued a secret share and may become known to other cryptographic devices in the cryptographic device network. Alternatively, the cryptographic device may become known to a proxy or hub device that is able to locate, select, and communicate with other cryptographic devices in the cryptographic device network. In some instantiations, there may be multiple proxy devices or hub devices in a cryptographic device network.

It may also be the case that each cryptographic device may have limited capability to communicate with other cryptographic devices in the cryptographic device network. For example, each cryptographic device may only be able to communicate with a maximum of two other cryptographic devices. In this way, the cryptographic devices form a chain, with each cryptographic device linked to two "neighboring" cryptographic devices. In this case, there may be multiple "proxy levels," as each cryptographic device acts as a proxy for its neighboring cryptographic devices.

A cryptographic device introduced to the network may transmit a message to all devices in the cryptographic device network which states that the new cryptographic device wishes to be included in the network, receiving a secret share and some sort of device identifier that allows devices within the cryptographic device network to uniquely identify it. The cryptographic devices in the network could communicate with one another and determine whether or not the new device should be allowed into the network. Once the devices reach some sort of consensus, the process of adding the new device to the network or rejecting it can begin.

This consensus could be based on a variety of factors. As an example, the cryptographic devices in the cryptographic device network could accept or reject the new cryptographic device based on an external directive. A user or external device could indicate to the cryptographic devices in the cryptographic device network, via a user interface or communication interface, that an additional device is to be added to the cryptographic device network, or that no additional devices are to be added to the cryptographic device network. As another example, the cryptographic devices in the cryptographic device network could jointly perform a security scan or audit of the new device in question, and accept that device into the network based on the results of that security scan or audit. If the cryptographic device does not meet the expected security results, the cryptographic devices may reject it and cease further electronic communication.

If the cryptographic devices agree to accept the new cryptographic device in the cryptographic device network, they may collectively perform a multi-party computation in order to generate a new secret share that may be provisioned to the new cryptographic device. This may be accomplished in a number of ways, the following is intended only as a non-limiting example making use of a Shamir's secret sharing based approach.

The cryptographic devices in the cryptographic device network may collectively determine an identifier to grant the new cryptographic device. Using a simple scheme where each cryptographic device is identified based on the order in which it was added to the cryptographic device network (i.e., the first cryptographic device is cryptographic device "1", the second is "2", etc.), the new cryptographic device may be granted the identifier n+1, where n is the number of devices currently in the cryptographic device network.

Next, the cryptographic devices in the cryptographic device network may collective select a threshold number of cryptographic devices from the cryptographic devices in the cryptographic device network. This could be accomplished randomly (i.e., by a random sampling of a threshold number of identifiers, wherein the cryptographic devices corresponding to those identifiers are selected for the purpose of generating a new secret share), or by other methods. For example, the cryptographic devices could each possess a "reputation score," governed by a number of factors, such as "suspicion" of corruption or compromise, susceptibility to compromise (as a measure of the relative security strength of the device and its desirability as a compromise target), historical data regarding its performance in threshold authenticated encryption functions, other usage data, etc. A threshold number of devices possessing the highest reputation score could be selected from the cryptographic devices in the cryptographic device network. Other methods may use a combination of random and directed selection or other tactics in order to select the threshold number of devices.

The selected cryptographic devices may calculate a new Lagrange coefficient $a_i$ such that $\Sigma_i\, a_i k_i = k_{n+1}$, where $k_{n+1}$ is the new secret share. The cryptographic devices could each share $a_i k_i$ via a simple additive secret sharing, such that each device among the selected cryptographic devices receives share $S_{i,j}$ such that $\Sigma_j S_{i,j} = a_i k_i$. Each selected cryptographic device may add up the received shares to produce values $U_j = \Sigma_i\, S_{i,j}$. These values may be transmitted to the new cryptographic device, which may then add the values together in order to produce its secret share. In this way the new secret share may be produced by a threshold number of devices without the threshold number of devices learning of the new secret share.

III. Encryption Sequence

An encryption operation according to embodiments will be discussed below with reference to FIG. 5. Generally speaking, an encryption operation involves a threshold number of selected cryptographic devices led by a single "encrypting device." This single device transmits out a commitment message to each other selected device, which each perform a partial computation using the commitment message and their secret share. These partial computations are transmitted back to the encrypting device, which combines the partial computations to produce a key generation seed. The encrypting device then uses the key generation seed to produce a cryptographic key, using a random or pseudorandom number generator. This cryptographic key may then be used to encrypt a message, such as a plaintext message, producing a ciphertext message. The encrypting device may then generate and output (as an example, transmit to another device or through a network) a ciphertext payload comprising the ciphertext message, the commitment message, and a device identifier (such as a number) corresponding to the encrypting device.

Figure 5:
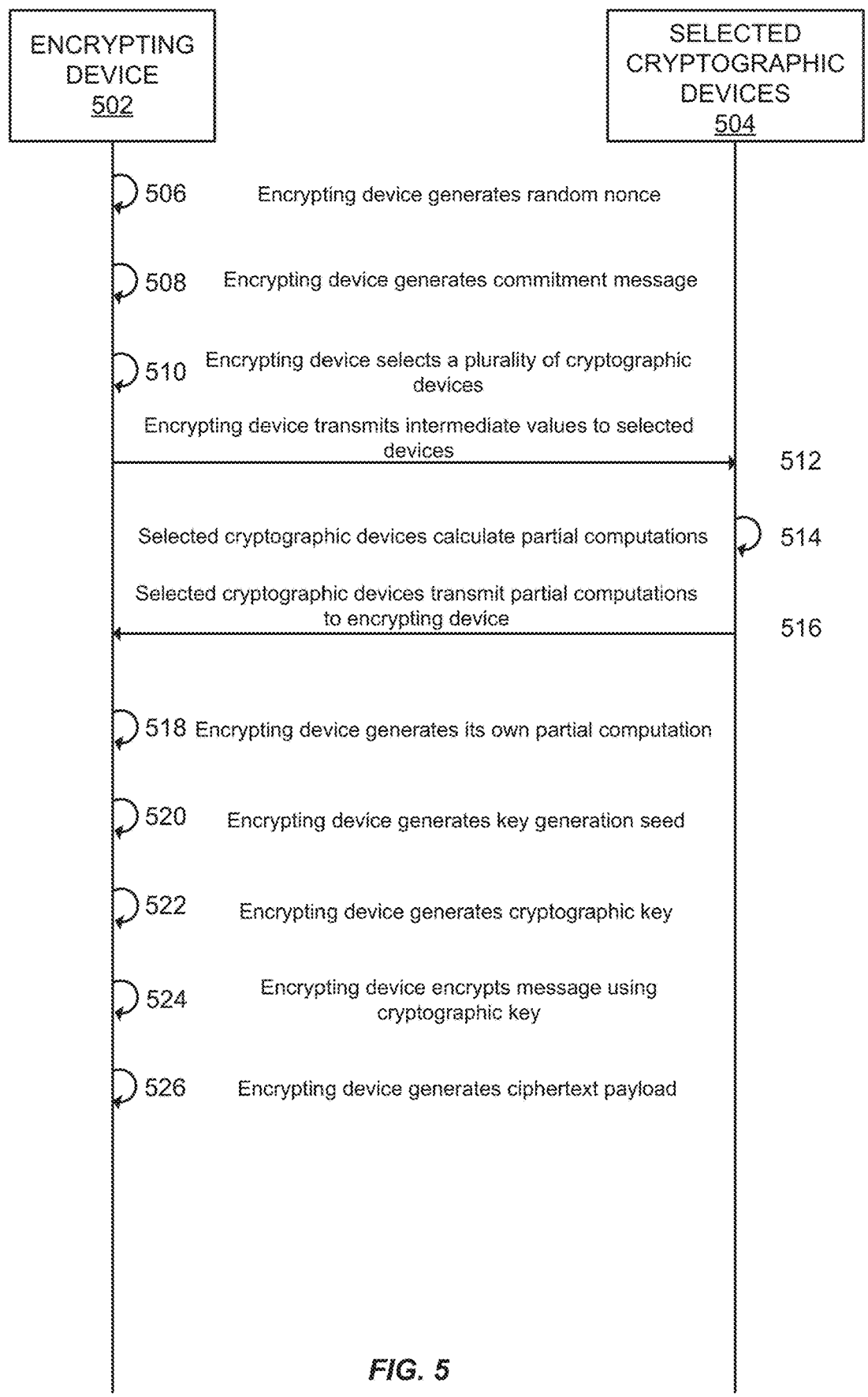
FIG. 5 shows a sequence diagram for an encryption process according to some embodiments.

FIG. 5 shows a sequence diagram of an encryption process performed by an encrypting device 502 and selected cryptographic devices 504 according to some embodiments.

At step 506, an encrypting device 502 generates a random nonce. This may be accomplished using a pseudorandom number generation module, such as the pseudorandom number generation module 208 in FIG. 2.

At step 508, the encrypting device 502 generates a commitment message based on the plaintext message and the random nonce. This commitment message may be generated using a software or code module such as the distributed pseudorandom function module 210 shown in FIG. 2. As discussed above, the commitment message may be generated using elliptic curve cryptography. In this case, the plaintext message could be point multiplied with a hidden value producing a resultant commitment message. See FIG. 8 and Section V below for additional details.

At step 510, the encrypting device 502 selects a plurality of cryptographic devices from a network of cryptographic devices, such as the cryptographic device network 102 from FIG. 1, such that including the encrypting device 502, a threshold number of cryptographic devices are participating in the encryption process. This selection process may occur using any suitable logical or random selection process, as described above. It may involve using code or instructions stored on a selection module, such as the selection module 212 from FIG. 2. Additional examples of selection processes are described below in Section V.

At step 512, the encrypting device 502 transmits, to the selected cryptographic devices 504, the commitment message. This may be accomplished using a communications interface, such as the communications interface 204 shown in FIG. 2. These may be transmitted using an appropriate protocol in an encrypted or unencrypted form. Additionally, they may be transmitted through a communications network, such as the Internet or a cellular communications network, among others.

In some embodiments, the encrypting device 502 may instead transmit the commitment message to a hub or proxy device. The hub or proxy device may then transmit the commitment message to the selected cryptographic devices 504. In some cases, the encrypting device 502 may not select cryptographic devices from the cryptographic device network and may instead allow the hub or proxy device to select cryptographic devices.

In other embodiments, the encrypting device 502 may not select a plurality of cryptographic devices. Instead, the encrypting device may select a single cryptographic device and transmit the commitment message to that cryptographic device. That cryptographic device may then select another cryptographic device and forward a copy of the commitment message to that cryptographic device. This process may continue until a threshold number of cryptographic devices receive the commitment message.

At step 514, the selected cryptographic devices 504 each use their respective secret shares and the commitment message to calculate partial computations. This may be accomplished with a computation module, such as the computational module 216 shown in FIG. 2. These partial computations will be later used by the encrypting device 502 to generate a key-generation seed.

Partial computations may be generated in a number of ways, and are discussed in greater detail with reference to FIGS. 8-9 in Section V below. A partial computation produced by cryptographic device i may be defined $h_i := w^{sk_i}$ Where $h_i$ is the partial computation, w is the commitment message and $sk_i$ is the secret share held by cryptographic device i.

Another such method to generate partial computations involves each selected cryptographic device generating a partial computations based on a DPRF such as AES. This can be accomplished by each cryptographic device encrypting the commitment message using its secret share as a cryptographic key, where the partial computation $h_{i,k}$ is defined $h_{i,k} := f_k(x)$, where $f_k(x)$ is a DPRF such as AES using secret share k and accepting the commitment message x as an input.

As there are a number of ways to generate partial computations, the preceding are intended only to be two non-limiting examples.

In step 516, the encrypting devices 502 receives the partial computations from each of the selected cryptographic devices 504. The partial computations may be received via a communication interface, such as the communication interface 204 in FIG. 2.

In step 518, the encrypting device 502 generates its own partial computation, using its own secret share and one of the above example partial computation methods, or another partial computation method. This partial computation, and the partial computations received from each of the other selected cryptographic devices 504 amounts to a threshold number of partial computations, the necessary number to complete encryption or decryption operations. The encrypting device 502 may generate this partial computation at any time between steps 508 and 520, it does not necessarily have to follow step 516 as described herein.

In step 520, the encrypting device 502 generates the key generation seed based on the partial computations. This may involve combining the received partial computations in a number of ways. It may also involve the generation of Lagrange coefficients or the use of a computational module, such as the computational module 216 in FIG. 2.

As an example, the encrypting device 502 may determine a Lagrange coefficient $\lambda_{i,S}$ for the secret S each of the i selected cryptographic devices 504 using formula (3) above. It may then determine the cryptographic key seed y as $y := \Pi_{i \in S} h_i^{\lambda_{i,s}}$ where $h_i$ are the secret shares and $\lambda_{i,S}$ are the calculated Lagrange coefficients. A secret share raised to its Lagrange coefficient may be referred to as an intermediate calculation.

In step 522, the encrypting device 502 generates, based on the key-generation seed, a cryptographic key. This may be a symmetric key, such as an AES key, and may be generated using any number of key generation algorithms, such as an "aes-128-ctr" key generator. This may be accomplished via a key generation module, such as the key generation module 218 from FIG. 2.

In step 524, the encrypting device 502 may encrypt the plaintext message and the random nonce using the cryptographic key generated in step 522 in order to produce a ciphertext message.

In step 526, the encrypting device 502 may generate a ciphertext payload consisting of the ciphertext message, the commitment message and a device identifier corresponding to the encrypting device.

There are some additional, optional steps which may be performed in order to improve the security of the encryption process. As an example, methods according to embodiments could make use of non-interactive zero-knowledge proofs (NIZK) in order to verify that a partial computation was performed correctly. Each of the i selected cryptographic devices 504 could transmit a NIZK $\pi_i$ to the encrypting device 502. The encrypting device 502 could verify each $\pi_i$. If any fail to verify, the encrypting device 502 could produce and output a "NULL" message, indicating that the encryption process was not completed successfully.

In some embodiments, the cryptographic device network may additionally include a hub or proxy device. The hub or proxy device may possess its own secret share, and may contribute its own partial computation to the encrypting device 502 as part of the encryption operation. Additionally, the partial computations may be communicated to the hub or proxy device, not the encrypting device 502, and the hub or proxy device may then transmit the partial computations to the encrypting device 502, such that the encrypting device 502 receives partial computations from only one device.

Some variations on this encryption process may occur in embodiments where devices are selected and commitment messages are transmitted in different ways. In the case where the encrypting device 502 transmits the commitment message to a first cryptographic device, which then forwards it to a second and so on, the encryption device 502 may receive partial computations in a similar manner. That is, a cryptographic device may transmit its partial computation to a second cryptographic device, which may then transmit its partial computation and the first partial computation to a third device, and so on, until the collection of partial computations are transmitted by the last cryptographic device to the encrypting device 502. This may be advantageous in circumstances where the encrypting device 502 has limited capacity to communicate with other cryptographic devices.

For more detail on the encryption sequence see Section V and FIG. 8.

IV. Decryption Sequence

A decryption operation according to embodiments will be discussed below with reference to FIG. 6. Generally speaking, a decryption operation involves a threshold number of selected cryptographic devices led by a single "decrypting device." This single device may parse a ciphertext payload to produce a ciphertext message, commitment message and device identifier. The decrypting device may transmits out a commitment message to each other selected device, which each perform a partial computation using the commitment message and their secret share. These partial computations are transmitted back to the encrypting device, which combines the partial computations to produce a key generation seed. The encrypting device may then use the key generation seed to produce a cryptographic key with a random or pseudorandom number generator. This cryptographic key may be used to decrypt a ciphertext message. Additionally, the decrypting device may generate a commitment message and compare it to the commitment message parsed from the ciphertext payload. If the commitment messages do not match, the decrypting device can output a NULL value rather than the decrypted ciphertext message, indicating that either the encryption or decryption operation was completed incorrectly.

Figure 6:
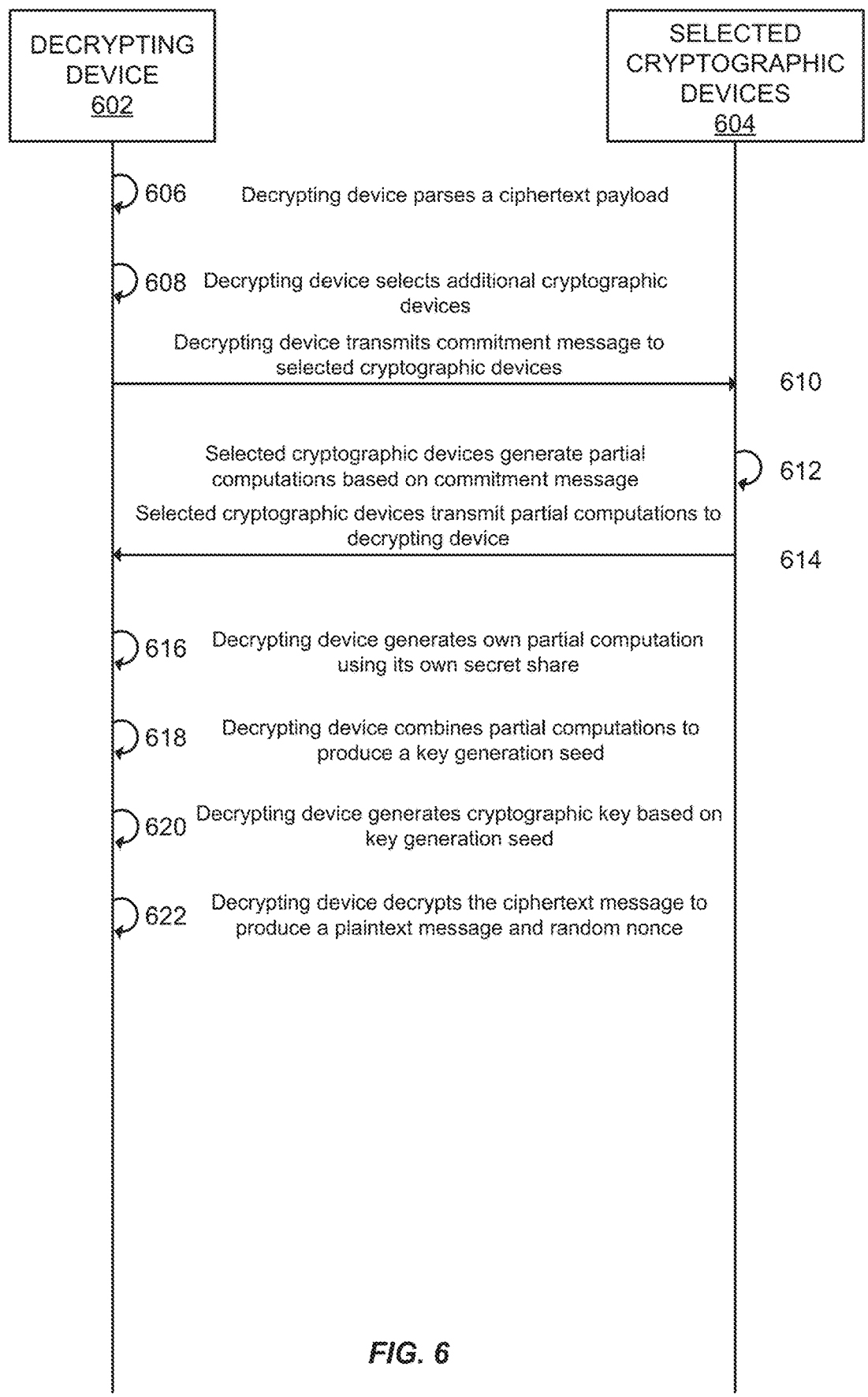
FIG. 6 shows a sequence diagram for a decryption process according to some embodiments.

FIG. 6 shows a decryption process performed by a decrypting device 602 and selected cryptographic devices 604 according to some embodiments.

At step 606, the decrypting device parses a ciphertext payload to produce a random nonce, a ciphertext message, a first confirmation value, and a commitment message. In many cases this may simply involve decoupling or separating a data packet in order to retrieve these elements. This may be the same ciphertext payload produced by the encrypting device 502 in step 526 of FIG. 5. It may also be a ciphertext payload received from an external source, such as the unsecure network 116 from FIG. 1.

At step 608, the decrypting device 602 may select a plurality of cryptographic devices from a network of cryptographic devices (shown in FIG. 6 as selected cryptographic devices 604). This process may be accomplished similarly to step 512 in FIG. 5. The decrypting device 602 may make use of a selection module and use some logic or random sampling process to choose a threshold number of devices from among the cryptographic device network.

At step 610, the decrypting device 602 may transmit the commitment message and a device identifier to the selected cryptographic devices 604. This transmission may occur through a communications network, such as the Internet or a cellular network, and may be performed using any suitable protocol, with messages either encrypted or unencrypted. It may be accomplished via a communications interface on both the decrypting device 602 and on each of the selected cryptographic devices 604, such as the communications interface 204 from FIG. 2.

In some embodiments, the decrypting device 602 may instead transmit the commitment message and device identifier to a hub or proxy device. The hub or proxy device may then transmit the commitment message and device identifier to the selected cryptographic devices 504. In some cases, the decrypting device 602 may not select cryptographic devices from the cryptographic device network and may instead allow the hub or proxy device to select cryptographic devices.

In other embodiments, the decrypting device 602 may not select a plurality of cryptographic devices. Instead, the decrypting device may select a single cryptographic device and transmit the commitment message and device identifier to that cryptographic device. That cryptographic device may then select another cryptographic device and forward a copy of the commitment message to that cryptographic device. This process may continue until a threshold number of cryptographic devices receive the commitment message and device identifier.

At step 612, the selected cryptographic devices 604 may compute partial computations for the commitment message using their respective secret shares. While there are many methods by which this may be accomplished, two examples substantially mirror those presented in the discussion of the encryption sequence in Section III. Namely, the selected cryptographic devices 604 may exponentiate the commitment message using their secret share, or the selected cryptographic devices 604 may use a pseudorandom function such as AES, using their respective key shares as cryptographic keys.

At step 614, the decrypting device 602 receives the partial computations from each of the selected cryptographic devices 604.

In step 616, the encrypting device 602 generates its own partial computation, using its own secret share and one of the above example partial computation methods, or another partial computation method. This partial computation, and the partial computations received from each of the other selected cryptographic devices 604 amounts to a threshold number of partial computations, the necessary number to complete encryption or decryption operations. The encrypting device 602 may generate this partial computation at any time between steps 608 and 618, it does not necessarily have to follow step 616 as described herein.

At step 618, the decrypting device 602 generates a key generation seed based on the partial computations. This may be substantially similar to either of the process used to generate the key generation seed described above in Section III.

At step 620, the decrypting device 602 may generate a cryptographic key based on the key generation seed. The generation of this cryptographic key is substantially similar to the generation of a cryptographic key described in FIG. 5 at step 522. It may also involve the use of a specialized software or hardware module, such as the key generation module 218 from FIG. 2

At step 622 the decrypting device 602 may decrypt the ciphertext message to produce a plaintext message and the random nonce. This may be accomplished using a symmetric encryption scheme such as AES.

There are some additional, optional steps which may be performed in order to improve the security of the decryption process. As an example, methods according to embodiments could make use of an efficient non-interactive zero-knowledge (NIZK) proof in order to verify that a partial computation was performed correctly. Each of the i selected cryptographic devices 604 could transmit a NIZK $\pi_i$ to the decrypting device 602. The decrypting device 602 could verify each $\pi_i$. If any fail to verify, the encrypting device 602 could produce and output a "NULL" or error message, indicating that the decryption process was not completed successfully. A potentially compromised device, from among the selected cryptogrammic devices 604, must either follow the protocol directly or be detected by the decrypting device 602.

Additionally, the decryption process may involve the decrypting device 602 generating a second commitment message and comparing it to the first commitment message. Once the ciphertext has been decrypted, the decrypting device 602 is in possession of both a plaintext message, the random nonce used in an earlier encryption operation and a commitment message produced using that plaintext message, and a random nonce, and a known hash function H. The decrypting device 602 can then produce a second commitment message using the hash function H and compare it to the first commitment message. If the commitment messages do not match, the decrypting device 602 may output a "NULL" message instead of the plaintext message, in order to indicate that either the earlier encryption operation or the decryption operation was not completed successfully.

In some embodiments, the cryptographic device network may additionally include a hub or proxy device. The hub or proxy device may possess its own secret share, and may contribute its own partial computation to the decrypting device 602 as part of the decryption operation. Additionally, the partial computations may be communicated to the hub or proxy device, not the decrypting device 602, and the hub or proxy device may then transmit the partial computations to the decrypting device 602, such that the decrypting device 602 receives partial computations from only one device.

Some variations on this encryption process may occur in embodiments where devices are selected and commitment messages are transmitted in different ways. In the case where the decrypting device 602 transmits the commitment message and device identifier to a first cryptographic device, which then forwards it to a second and so on, the decryption device 602 may receive partial computations in a similar manner. That is, a cryptographic device may transmit its partial computation to a second cryptographic device, which may then transmit its partial computation and the first partial computation to a third device, and so on, until the collection of partial computations are transmitted by the last cryptographic device to the decrypting device 602. This may be advantageous in circumstances where the decrypting device 602 has limited capacity to communicate with other cryptographic devices.

V. Pseudocode and Results

Embodiments may be better understood with reference to some pseudocode, shown in FIGS. 7-9 and described in some detail below. FIG. 7 shows pseudocode detailing setup and distributed encryption and decryption, FIG. 8 shows pseudocode detailing the "DPRF evaluation" function using an ECC-based approach, and FIG. 9 shows pseudocode detailing setup and the DPRF evaluation function for any pseudorandom function, such as AES.

FIGS. 10-11 show experimental results relating to encryption throughput, in number of encryptions per second, encryption latency in milliseconds, and bandwidth, in throughput in megabits per second for three encryption protocols according to embodiments: $W_{AES}$, a protocol that makes use of AES as its PRF, $W_{DDH}$, a protocol that makes use of ECC, and the DDH assumption, and $F_{DDH}$, a protocol that makes use of ECC, and the DDH assumption, and additionally verifies that partial computations were computer correctly using a non-interactive zero-knowledge proof. Experiment trials were conducted for the three protocols variants across a number of different thresholds t and devices n.

FIG. 7 shows the "ingredients" used for one threshold authenticated encryption and decryption process according to embodiments as well as some specific steps involved in threshold authenticated encryption and decryption. The discussion below is generally a more technically focused variation on the discussion on the encryption and decryption sequence in Sections III and IV respectively.

The ingredients include a (n, t)-DPRF protocol, that is to say, a distributed pseudorandom function enabled by a threshold number of devices t out of a total number of devices n, as well as a pseudorandom generator PRG and a hash function H modeled as a random oracle The setup procedure may involve generating a number of secret shares, and distributing those secret shares to each of the n devices, such that the secret share of the nth device is denoted $[[sk]]_{[n]}$.

The distributed encryption process (DistEnc), may involve a cryptographic device j (the "encrypting device" as described above) wanting to encrypt a message m. Cryptographic device j may generate a value α using the hash function H, a random nonce ρ (the random value as described above), and the message m. α is an example of a commitment message as described above. The encrypting device may select one less than a threshold number of devices, such that when the encrypting device itself is included in the encryption operation, a threshold number of devices are participating. The encrypting device may transmit α, and an identifying number j to each selected cryptographic device (parties in S).

Each selected cryptographic device in S except j may check to see if j and α are coming from cryptographic device j. If j and α are not coming from cryptographic device j, improper or malicious use may be occurring. If a cryptographic device determines that j and α are not coming from cryptographic device j, that cryptographic device may return "⊥", a contradictory value (described above as "NULL"). This NULL or error value indicates to the encrypting device that the encryption process has failed, and as a result the encrypting device may output a ciphertext payload c equal to the NULL value.

Otherwise, each selected cryptographic device, including the encrypting device may collectively run an instance of the DPRF evaluation function in order to produce a key generation seed w. The encrypting device may generate a cryptographic key using w and the pseudorandom generator PRG, then use it to encrypt a concatenated message comprising m, the plaintext message and ρ, the random value, resulting in the production of a ciphertext message e. It then may generate the ciphertext payload c using its identifier j, α, and e.

FIG. 7 also shows a distributed decryption (DistDec) protocol according to embodiments. In the distributed decryption protocol, a decrypting device (party j'), may parse a ciphertext payload c to determined j, the corresponding encrypting device identifier, α, and the ciphertext e. The decrypting device then selects one less than a threshold number of devices, such that including the decrypting device a threshold number of devices are participating in the decryption operation. The decrypting device then transmits the commitment message a and device identification number j, to each of the selected cryptographic devices.

Each selected cryptographic device, in addition to the decrypting device itself may generate partial computations based on the commitment message and their respective secret shares. These partial computations may then be transmitted back to the decrypting device, which may combine those partial computations in order to produce a key generation seed. Using the pseudorandom number generator, PRG, the decrypting device may generate a cryptographic key using the key generation seed, and may use that cryptographic key in order to decrypt the ciphertext message, producing a plaintext message and the random nonce. The plaintext message and random nonce may then be used with the hash function H in order to produce another commitment message, which may then be compared to a in order to verify if the encryption and decryption process was completed successfully. If the commitment messages do not match, the decrypting device may produce a NULL message, indicating that the process was not completed successfully, otherwise the decrypting device may output the decrypted message.

FIG. 8 shows some details regarding the DPRF evaluation function according to some embodiments. The ingredients include a multiplicative cyclic group G of prime order p, where the DDH assumption holds and a hash function H that selects an element from G. Also involved is a Shamir's secret sharing scheme SSS and a non-interactive, zero-knowledge proof system (NIZK).

As part of the setup procedure, secret keys are sampled form the Shamir's secret sharing scheme SSS and distributed to each cryptographic device in the cryptographic device network.

As part of the evaluation itself, first the selected cryptographic devices verify that the size of the selected set of cryptographic devices |S| is greater than or equal to the threshold number of devices t, otherwise, the evaluation function outputs a NULL value.

Provided the threshold has been met, each selected cryptographic device i may take the received commitment value w: =H(x) and exponentiates it using its corresponding secret key $sk_i$ in order to produce a partial computation $h_i$. Additionally, each selected device may produce a non-interactive zero-knowledge proof $\pi_i$ verifying that the DPRF evaluation was carried out correctly. Each select cryptographic device may then sends to the encrypting or decrypting device, the partial computations $h_i$, which may be combined by the encrypting or decrypting device in order to produce the key generation seed y.

FIG. 9 shows some detail regarding the DPRF evaluation function according to some embodiments. Unlike FIG. 8, this DPRF evaluation is based on any DPRF, such as AES.

As part of the setup, a number d of secrets are generated and distributed to each of d distinct subsets of cryptographic devices $D_1, \ldots, D_d$. This guarantees that any subset of cryptographic devices of threshold size contain all d secrets, such that a shared secret can be reconstructed from the d secrets and used as part of cryptographic operations.

The selected cryptographic devices then verify that at least a threshold number of devices is selected, otherwise they output a NULL value. If the threshold number of devices is selected, each selected cryptographic device applies a pseudorandom function f to the received commitment message using its secret shares. For AES, this may involve a given cryptographic device using its secret shares as cryptographic keys to encrypt the received commitment message: $h_{i,k}:=f_k(x)$ for all $k \in sk_i$. These partial computations hi,k may then be transmitted to the encrypting or decrypting device, along with a NIZK proof $\pi_i$ indicating that all partial computations were computed correctly.

The encrypting or decrypting device may then confirm that the NIZK proofs verify, outputting a NULL value otherwise. If not, it may combine the partial computations to produce a key generation seed, which may be used for future encryption or decryption operations.

FIG. 10 shows experimental trials in a LAN setting (10 Gbps transmission rate and 0.1 ms RTT latency) for throughput, latency, and bandwidth for the abovementioned three encryption protocols $W_{AES}$, $W_{DDH}$, $F_{DDH}$, for n=3, 4, 6, 12, 18, and 24 cryptographic devices in the cryptographic device networks and for thresholds t of n/3, n/2, 2n/3, n−2, and 2.

The results show that $W_{AES}$ generally outperforms $W_{DDH}$ and $F_{DDH}$ in throughput, latency, and bandwidth, performing better for small values of n and t, with performance approaching that of $W_{DDH}$ and $F_{DDH}$ for larger values of n. This may result from the fact that the AES-based protocol has exponential overhead in the number of cryptographic devices.

FIG. 11 shows experimental trials in a WAN setting (40 Mbps half-duplex and 80 ms latency) for throughput, latency, and bandwidth for the abovementioned three encryption protocols $W_{AES}$, $W_{DDH}$, $F_{DDH}$, for n=3, 4, 6, 12, 18, and 24 cryptographic devices in the cryptographic device network and for thresholds t of n/3, n/2, and 2n/3.

As with FIG. 10, the results show that $W_{AES}$ generally outperforms $W_{DDH}$ and $F_{DDH}$ in throughput, latency, and bandwidth, performing better for small values of n and t, with performance approaching that of $W_{DDH}$ and $F_{DDH}$ for larger values of n. This may also result from the fact that the AES-based protocol has exponential overhead in the number of cryptographic devices.

VI. Advantages

Embodiments present a number of advantages over conventional multi-party encryption schemes.

As one example, embodiments provide greater flexibility. By providing for a threshold number of devices, embodiments provide for several flexible groups of devices that may be used during an encryption or decryption operation. This means that even if some devices are unavailable, either due to power outage, unstable network connection, or probable compromise, other cryptographic devices may be selected to perform cryptographic functionality.

Further, a different group of cryptographic devices may be selected for encryption and decryption operations. This presents a considerable advantage over a conventional system, where the same group of cryptographic devices that perform an encryption operation are also needed to perform the corresponding decryption operation. In a conventional system, if a cryptographic device fails sometime after an encryption operation and sometime before a decryption operation, the encrypted data is effectively inaccessible until that cryptographic device is brought back online. If that cryptographic device is permanently disabled, it may be impossible to recover the encrypted data. As the method according to embodiments does not require the same group of cryptographic devices to be used for encryption and decryption operations, the system can perform encryption and decryption operations with high uptime and little risk of failure.

Embodiments can also allow additional cryptographic devices to be added to the cryptographic device network with relative ease. Since the method is based off a Shamir's secret sharing protocol, new secret shares can always be produced, provided a threshold number of devices are available to perform a multi-party computation. Although the discussion above relates to determining just the secret value (the zeroth order coefficient) of the polynomial P(x), any and all coefficients of the polynomial can be reproduced. This means that if a new device is to be added, other devices in the network could recreate the polynomial, sample the polynomial at the new sampling value, and provide the resulting secret share to the new cryptographic device. This is in contrast to conventional systems, that may be unable to generate new secret shares without having to regenerate all previous secret shares.

This likewise provides an advantage if a particular cryptographic device "forgets" its shared secret. In the case of a cryptographic device malfunction that clears the secure memory of the cryptographic device, a threshold number of other cryptographic devices could recreate the polynomial, and sample that polynomial using the cryptographic device's known "sample request number" or identity (in the case where the $n^{th}$ cryptographic devices receives a secret share corresponding to P(n)) and provision that shared secret to the cryptographic device. In a conventional system, if a cryptographic device forgets or loses its secret share, the entire system may have to be reset, and secret shares may have to be provisioned to all cryptographic devices.

Additionally, embodiments present a higher level of security than other methods. A hacker or malicious user can only compromise the system provided they can compromise a threshold number of devices. In a conventional, symmetric, non-multi-party system, a hacker or adversary only needs to compromise one device in order to retrieve the symmetric key, at which point the hacker is able to encrypt or decrypt messages at will.

Likewise, the threshold number can be changed based on a user's security needs. For high security applications, a user may wish for the threshold number of devices to be a large number of devices relative to the total number of devices. For lower security applications, a user may adopt a lower threshold number of devices, in order to improve the reliability and uptime of the system.

Also, methods according to embodiments of the invention provide that either the message or ciphertext being encrypted or decrypted during the protocols are only known to the initiating party (the encrypting device or decrypting device respectively). This reduces the probability that a compromised device gains access to the message or ciphertext, as the encrypting device or decrypting device itself must be compromised, rather than any device involved in the threshold authenticated encryption protocol.

VII. Computer System

Figure 12:
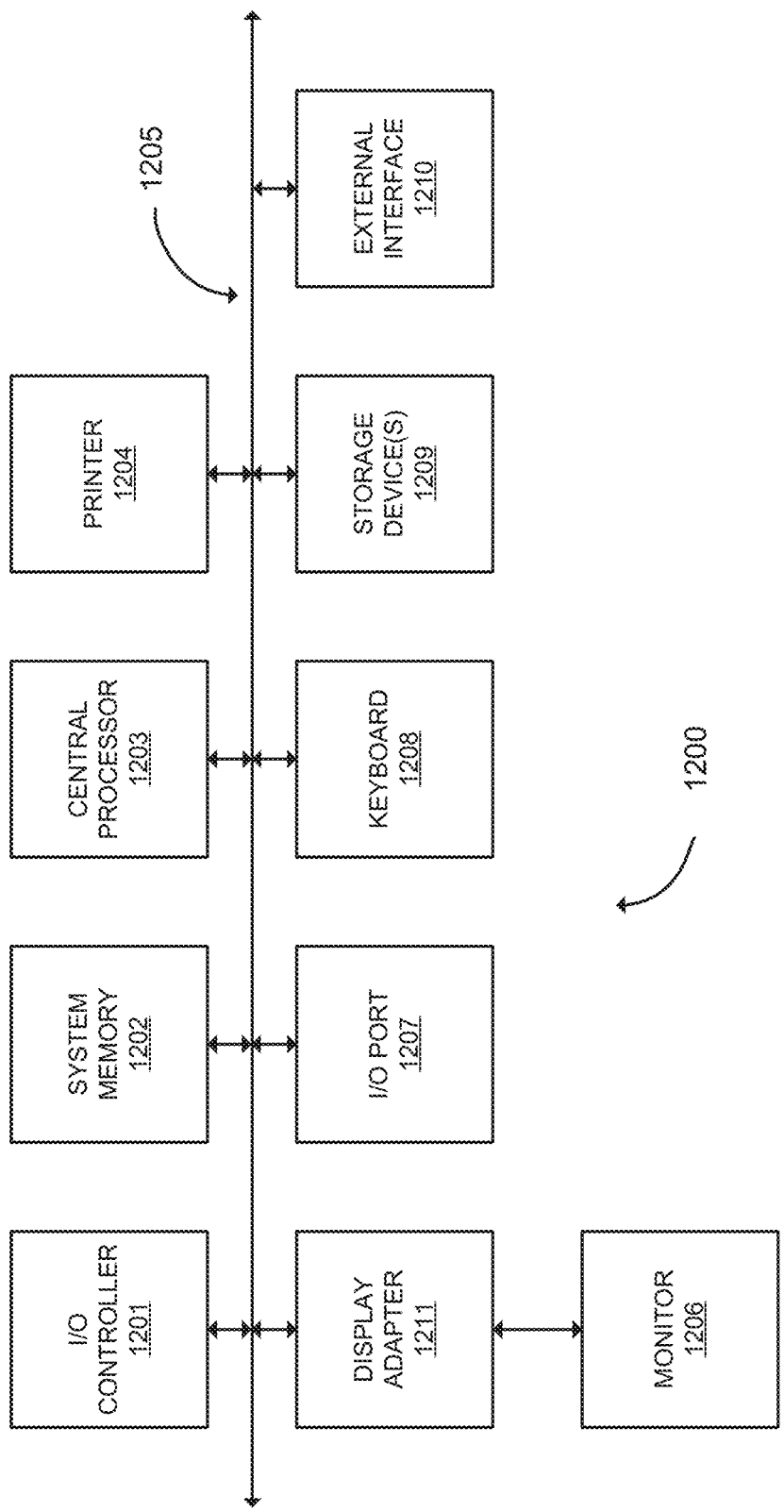
FIG. 12 shows a computer system according to some embodiments.

Any of the computer systems mentioned herein may utilize any suitable number of subsystems. Examples of such subsystems are shown in FIG. 12 in computer apparatus 1200. In some embodiments, a computer system includes a single computer apparatus, where the subsystems can be components of the computer apparatus. In other embodiments, a computer system can include multiple computer apparatuses, each being a subsystem, with internal components.

The subsystems shown in FIG. 12 are interconnected via a system bus 1205. Additional subsystems such as a printer 1204, keyboard 1208, storage device(s) 1209, monitor 1206, which is coupled to display adapter 1211, and others are shown. Peripherals and input/output (I/O) devices which couple to I/O controller 1201, can be connected to the computer system by any number of means known in the art such as input/output (I/O) port 1207 (e.g., USB, FireWire®). For example, I/O port 1207 or external interface 1210 (e.g. Ethernet, Wi-Fi, etc.) can be used to connect computer system 1200 to a wide area network such as the Internet, a mouse input device, or a scanner. The interconnection via system bus 1205 allows the central processor 1203 to communicate with each subsystem and to control the execution of instructions from system memory 1202 or the storage device(s) 1209 (e.g., a fixed disk, such as a hard drive or optical disk), as well as the exchange of information between subsystems. The system memory 1202 and/or the storage device(s) 1209 may embody a computer readable medium. Any of the data mentioned herein can be output from one component to another component and can be output to the user.

A computer system can include a plurality of the same components or subsystems, e.g., connected together by external interface 1210 or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method for encrypting a message performed at an encrypting device, the method comprising:
   generating a random nonce;
   generating a commitment message based upon the message and the random nonce;
   transmitting the commitment message to a plurality of cryptographic devices or a proxy device such that the plurality of cryptographic devices receive the commitment message, the plurality of cryptographic devices respectively storing a plurality of secret shares that are generated from a secret value;
   receiving, from each of the plurality of cryptographic devices or the proxy device, a plurality of partial computations corresponding to a key generation seed, each of the plurality of partial computations being generated by a respective cryptographic device of the plurality of cryptographic devices using (1) a respective secret share of that cryptographic device and (2) the commitment message;
   generating the key generation seed based on the plurality of partial computations;
   generating a cryptographic key by applying a cryptographic function to the key generation seed;
   encrypting, using the cryptographic key, the message and the random nonce to produce a ciphertext message; and
   generating a ciphertext payload comprising the commitment message and the ciphertext message,
   wherein, due to the plurality of partial computations being generated using the commitment message, the key generation seed and the cryptographic key are generated based on the message to be encrypted.

2. The method of claim 1, wherein the plurality of cryptographic devices comprises a cryptographic device chain, comprising a first cryptographic device or the proxy device, one or more subsequent cryptographic devices, and a last cryptographic device.

3. The method of claim 1, wherein a number of cryptographic devices included in the plurality of cryptographic devices is equal to at least a predetermined threshold number of devices, and wherein the predetermined threshold number of devices is less than a total number of cryptographic devices in a network of cryptographic devices that store secret shares.

4. The method of claim 1, wherein each of the plurality of partial computations received from the plurality of cryptographic devices are generated by encrypting the commitment message using a respective one of the plurality of secret shares as a symmetric encryption key or to derive the symmetric encryption key.

5. The method of claim 1, wherein the cryptographic key is a random number generated using the key generation seed as an input value to a random number generator.

6. The method of claim 1, further comprising:
   receiving, from each of the plurality of cryptographic devices, a plurality of verification values indicating that the partial computations were computed correctly; and
   verifying the verification values to confirm that the partial computations were computed correctly; and
   when any verification value fails to verify, outputting an error message to indicate that encryption was unsuccessful.

7. The method of claim 1, wherein the commitment message is a hash value generated by hashing the message and the random nonce using a hashing function.

8. The method of claim 1, further comprising:
   transmitting a device identifier to the plurality of cryptographic devices, the device identifier uniquely identifying the encrypting device, wherein the ciphertext payload further comprises the device identifier.

9. The method of claim 1, wherein generating the key generation seed includes:
   calculating a plurality of Lagrange coefficients corresponding to each of the plurality of partial computations;
   generating a plurality of intermediate calculations by exponentiating the plurality of partial computations using a respective one of the plurality of Lagrange coefficients; and
   generating the key generation seed as a product of each of the plurality of intermediate calculations.

10. The method of claim 1, wherein the key generation seed is generated by calculating a binary exclusive-OR of the plurality of partial computations.

11. The method of claim 1, wherein the plurality of partial computations are encrypted using a symmetric key, the method further comprising:
    decrypting the plurality of partial computations.

12. A method for decrypting a ciphertext message performed at a decrypting device, the method comprising:
    parsing a ciphertext payload to produce a first commitment message and the ciphertext message corresponding to an encrypted message of a message comprising plaintext, wherein the first commitment message is generated based on the message comprising the plaintext;
    transmitting the first commitment message to a proxy device or a plurality of cryptographic devices, the plurality of cryptographic devices respectively storing a plurality of secret shares that are generated from a secret value;
    receiving, from each of the plurality of cryptographic devices or the proxy device, a plurality of partial computations corresponding to a key generation seed, each of the plurality of partial computations being generated by a respective cryptographic device of the plurality of cryptographic devices using (1) a respective secret share of that cryptographic device and (2) the first commitment message;
    generating the key generation seed based upon the plurality of partial computations;
    generating a cryptographic key by applying a cryptographic function to the key generation seed; and
    decrypting, using the cryptographic key, the ciphertext message to produce the message and a random nonce,
    wherein, due to the plurality of partial computations being generated using the first commitment message, the key generation seed and the cryptographic key are generated based on the message comprising the plaintext.

13. The method of claim 12, wherein the plurality of cryptographic devices comprises a cryptographic device chain comprising a first cryptographic device or the proxy device, a plurality of subsequence cryptographic devices, and a final cryptographic device.

14. The method of claim 12, wherein a number of cryptographic devices included in the plurality of cryptographic devices is equal to at least a predetermined threshold number of devices, and wherein the predetermined threshold number of devices is less than a total number of cryptographic devices in a network of cryptographic devices that store secret shares.

15. The method of claim 12, wherein each of the plurality of partial computations received from the plurality of cryptographic devices are generated by encrypting the first commitment message using a respective one of the plurality of secret shares as a symmetric encryption key or to derive the symmetric encryption key.

16. The method of claim 12, further comprising:
receiving, from each of the plurality of cryptographic devices, a plurality of verification values indicating that the partial computations were computed correctly;
verifying the verification values to confirm that the partial computations were computed correctly; and
when any verification value fails to verify, outputting an error message to indicate that decryption was unsuccessful.

17. The method of claim 12, further comprising:
generating a second commitment message using the message and the random nonce;
comparing the first commitment message to the second commitment message; and
when the first commitment message and the second commitment message are not identical, outputting an error message to indicate that decryption was unsuccessful.

18. The method of claim 17, further comprising:
parsing the ciphertext payload to produce a device identifier, the device identifier uniquely identifying an encrypting device; and
transmitting the device identifier to the plurality of cryptographic devices.

19. The method of claim 17, additionally comprising:
generating an additional partial computation corresponding to the key generation seed, the additional partial computation being generated using the first commitment message and a secret share stored on the decrypting device, and wherein the key generation seed is generated based upon the plurality of partial computations and the additional partial computation.

20. The method of claim 17, further comprising:
receiving, from a new cryptographic device, an identification value corresponding to the new cryptographic device;
selecting a subsequent plurality of other cryptographic devices from a network of cryptographic devices;
transmitting the identification value to each cryptographic device of the subsequent plurality of other cryptographic devices;
receiving, from each cryptographic device of the subsequent plurality of other cryptographic devices, a plurality of subsequent partial computation corresponding to a new secret share;
generating, the new secret share using the plurality of subsequent partial computations; and
transmitting the new secret share to the new cryptographic device.

* * * * *